United States Patent
Alanqar et al.

(10) Patent No.: US 11,703,246 B2
(45) Date of Patent: Jul. 18, 2023

(54) BUILDING HVAC SYSTEM WITH FAULT-ADAPTIVE MODEL PREDICTIVE CONTROL

(71) Applicant: Johnson Controls Tyco IP Holdings LLP, Milwaukee, WI (US)

(72) Inventors: Anas W. I. Alanqar, Milwaukee, WI (US); Michael J. Wenzel, Grafton, WI (US); Mohammad N. Elbsat, Milwaukee, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/388,776

(22) Filed: Jul. 29, 2021

(65) Prior Publication Data
US 2022/0034543 A1 Feb. 3, 2022

Related U.S. Application Data

(60) Provisional application No. 63/058,999, filed on Jul. 30, 2020.

(51) Int. Cl.
*F24F 11/32* (2018.01)
*F24F 11/63* (2018.01)
(Continued)

(52) U.S. Cl.
CPC .............. *F24F 11/63* (2018.01); *F24F 11/32* (2018.01); *G05B 19/042* (2013.01); *G05B 23/0283* (2013.01); *G05B 2219/2614* (2013.01)

(58) Field of Classification Search
CPC . F24F 11/63; F24F 11/32; F24F 11/62; G05B 19/042; G05B 23/0283; G05B 2219/2614; G05B 13/044; G05B 23/0294
See application file for complete search history.

(56) References Cited

U.S. PATENT DOCUMENTS 9,447,985 B2  9/2016  Johnson
10,706,375 B2  7/2020  Wenzel et al.
(Continued)

FOREIGN PATENT DOCUMENTS

CA    2957726 A1    3/2016
CA    3043996 A1    2/2018
(Continued)

OTHER PUBLICATIONS

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
(Continued)

*Primary Examiner* — Michael W Choi
(74) *Attorney, Agent, or Firm* — Foley & Lardner LLP

(57) ABSTRACT

A method for automatically adapting a predictive model used to control a heating, ventilation, or air conditioning (HVAC) system in a building to compensate for a detected fault in the HVAC system is shown. The method includes obtaining an indication of the detected fault in the HVAC system or a zone in the building. The method further includes determining a predicted impact of the detected fault on an operational performance of the HVAC system. The method further includes adjusting one or more parameters of the predictive model based on the predicted impact of the detected fault to generate a fault-adapted predictive model. The method further includes operating the HVAC system to control an environmental condition of the building using the fault-adapted predictive model.

15 Claims, 9 Drawing Sheets

(51) Int. Cl.
    G05B 23/02    (2006.01)
    G05B 19/042   (2006.01)

(56) References Cited

U.S. PATENT DOCUMENTS

| | | | |
|---|---|---|---|
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 2005/0235664 A1* | 10/2005 | Pham | F04C 28/00 62/126 |
| 2017/0314800 A1* | 11/2017 | Bengea | G05B 13/04 |
| 2019/0234638 A1* | 8/2019 | Song | F24F 11/62 |
| 2020/0372030 A1* | 11/2020 | Posner | G06F 16/24544 |
| 2021/0041127 A1 | 2/2021 | Risbeck et al. | |
| 2021/0302041 A1* | 9/2021 | Brahme | F25B 49/02 |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

* cited by examiner

BUILDING HVAC SYSTEM WITH FAULT-ADAPTIVE MODEL PREDICTIVE CONTROL

CROSS-REFERENCE TO RELATED PATENT APPLICATION

This application claims the benefit of and priority to U.S. Provisional Patent Application No. 63/058,999 filed Jul. 30, 2020, the entire disclosure of which is incorporated by reference herein.

BACKGROUND

The present disclosure relates to control systems for buildings. More particularly, the present application relates to automatically adjusting or adapting a predictive model based on detected faults in a heating, ventilation, or air conditioning (HVAC) system.

Sensor and actuator faults can common problems faced in HVAC control systems. When implementing a control system that optimizes asset allocation (e.g., predictive model control, etc.), actuator and sensor faults pose many difficulties in achieving optimal control. Sensor faults or failures can result in incorrect feedback measurements which can affect the control action implemented for optimal control. This can lead to increased amounts of used energy and reduced cost saving.

Similarly, actuator faults can refer to the failure of actuators to correctly respond to a commanded control action. Causes of actuator faults can include valve faults (e.g., a valve getting stuck, etc.) or a software failure at the actuator layer (e.g., a malfunctioning circuit board at the actuator layer that receives the control commands). As such, there exists a need for robust control strategies for sensor and actuator faults such that the control algorithms can be robust in the presence of faults and still provide the most optimal control actions possible provided that the faults have been detected and occurred.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a method for automatically adapting a predictive model used to control a heating, ventilation, or air conditioning (HVAC) system in a building to make adjustments based on a detected fault in the HVAC system. The method includes obtaining an indication of the detected fault in the HVAC system. The method includes determining an impact of the detected fault on an operational performance of at least one of the HVAC system or a zone of the building. The method includes adjusting one or more parameters of the predictive model based on the impact of the detected fault to generate a fault-adapted predictive model. The method includes operating the HVAC system to control an environmental condition of the building using the fault-adapted predictive model.

In some embodiments, operating the HVAC system to control the environmental condition includes operating a portion of the HVAC system to provide a constant amount of heating or cooling upon determining that the detected fault is based on a stuck actuator fault from a stuck actuator, and adjusting one or more constraints affecting inputs to the predictive model based on the stuck actuator.

In some embodiments, obtaining the indication of the detected fault in the HVAC system includes determining that the detected fault is associated with a sensor in the HVAC system, and adjusting the one or more parameters of the predictive model includes reducing the one or more parameters by an amount proportional to a capacity of the HVAC device relative to a total capacity of the HVAC system.

In some embodiments, the type of the detected fault is at least one of a type of: a fault that results in a constant cooling or heating, a fault that renders the system unavailable, a fault that reduces the available capacity, or a fault that reduces the efficiency of the HVAC system.

In some embodiments, determining the impact of the detected fault includes measuring an amount of constant cooling energy or heating energy, wherein the constant cooling energy or heating energy are tangible amounts of energy. In some embodiments, the detected fault provides a constant heating or cooling amount.

In some embodiments, adjusting one or more parameters of the predictive model includes triggering an identification process of at least one of one or more dynamics of the HVAC system or one or more dynamics of the building. In some embodiments, the identification process is based on an accuracy error exceeding a threshold.

In some embodiments, determining the impact of the detected fault includes calculating a thermal capacitance within a building zone, the thermal capacitance related to the operational performance of the HVAC system.

In some embodiments, adjusting one or more parameters of the predictive model includes adjusting one or more parameters that define a set of dynamics of the HVAC system or a set of dynamics of one or more zones in the building and adjusting one or more parameters that define one or more threshold values for control variables in the HVAC system.

In some embodiments, selecting an optimal control scheme includes determining the detected fault is a decreased efficiency type of fault and the effect of the detected fault on at least one of the HVAC system or the zone of the building, the effect including a tangible amount of energy added to or removed from the HVAC system and adjusting one or more parameters of the predictive model to incorporate the effect of the detected fault.

In some embodiments, obtaining an indication of the detected fault in the HVAC system includes receiving data from one or more HVAC sensors, the data including operational information relating to at least one of the HVAC system or the zone of the building, comparing the received data to a predetermined range of normal operation, determining the detected fault based on the received data being outside of the predetermined range of operation.

In some embodiments, adjusting the one or more parameters of the predictive model includes re-identifying the system model by performing an event-based system identification process.

In some embodiments, the method further includes performing a fault detection process to generate the indication of the detected fault, the fault detection process including using a neural network to detect abnormal operation of the HVAC system based on a set of training data that indicates normal operation of the HVAC system.

In some embodiments, operating the HVAC system to control an environmental condition of the building includes using the model to generate constraints for an optimization problem.

In some embodiments, obtaining an indication of the detected fault in the HVAC system includes obtaining an indication of abnormal operation in one or more building management systems (BMSs) or degradation in compressor operation or air flow restriction in an air duct or refrigerant leakage.

Another implementation of the present disclosure is a controller for automatically adapting a predictive model used to control a heating, ventilation, or air conditioning (HVAC) system in a building to make adjustments based on a detected fault in the HVAC system, the controller including a processing circuit. The processing circuit is configured to obtain an indication of the detected fault in the HVAC system, determine an impact of the detected fault on an operational performance of at least one of the HVAC system or a zone of the building, adjust one or more parameters of the predictive model based on the impact of the detected fault to generate a fault-adapted predictive model, and operate the HVAC system to control an environmental condition of the building using the fault-adapted predictive model.

In some embodiments, operating the HVAC system to control the environmental condition includes operating a portion of the HVAC system to provide a constant amount of heating or cooling upon determining that the detected fault is based on a stuck actuator fault, and adjusting one or more parameters of the predictive model includes adjusting the predictive model to provide a constant amount of heating or cooling and reducing an available heating or cooling capacity of a remaining portion of the HVAC system.

In some embodiments, selecting an optimal control scheme includes determining the detected fault is a decreased efficiency type of fault and the effect of the detected fault on the HVAC system, the effect including a tangible amount of energy added to or removed from the HVAC system and adjusting one or more parameters of the predictive model to incorporate the effect of the detected fault.

In some embodiments, determining the impact of the detected fault includes measuring an amount of constant cooling energy or heating energy, wherein the constant cooling energy or heating energy are tangible amounts of energy. In some embodiments, the detected fault provides a constant heating or cooling amount.

In some embodiments, the indication of the detected fault indicates that a HVAC device of the HVAC system has failed. In some embodiments, adjusting the one or more parameters of the predictive model includes reducing the one or more parameters by an amount proportional to a capacity of the HVAC device relative to a total capacity of the HVAC system.

Another implementation of the present disclosure is one or more non-transitory computer-readable storage media having computer-executable instructions stored thereon that, when executed by one or more processors, cause the one or more processors to perform operations. The operations include obtaining an indication of a detected fault in a system, determining an impact of the detected fault on an operational performance of the system, adjusting one or more inputs of an optimization problem based on the impact of the detected fault to generate a fault-adapted predictive model, and operating the system to control a variable state or condition of the system using the fault-adapted predictive model.

DETAILED DESCRIPTION

Overview

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Referring generally to the FIGURES, systems and methods for optimizing control in a heating, ventilation, or air conditioning (HVAC) building management system are shown. In some embodiments, this control optimization can be performed by one or more building controllers. The controller can receive sensor data from one or more HVAC sensors that are monitoring operation of HVAC devices in the BMS. In some embodiments, a neural network is used to determine faulty sensor data, which indicates a malfunctioning HVAC device (e.g., stuck valve, stuck damper, broken actuator, etc.). The controller may then select an optimal control scheme based on the type and criticality of the faulty sensor data and adjust the operation of one or more HVAC equipment in the building management system based on the optimal control scheme.

Building Management System and HVAC System

Building Site

Figure 1:
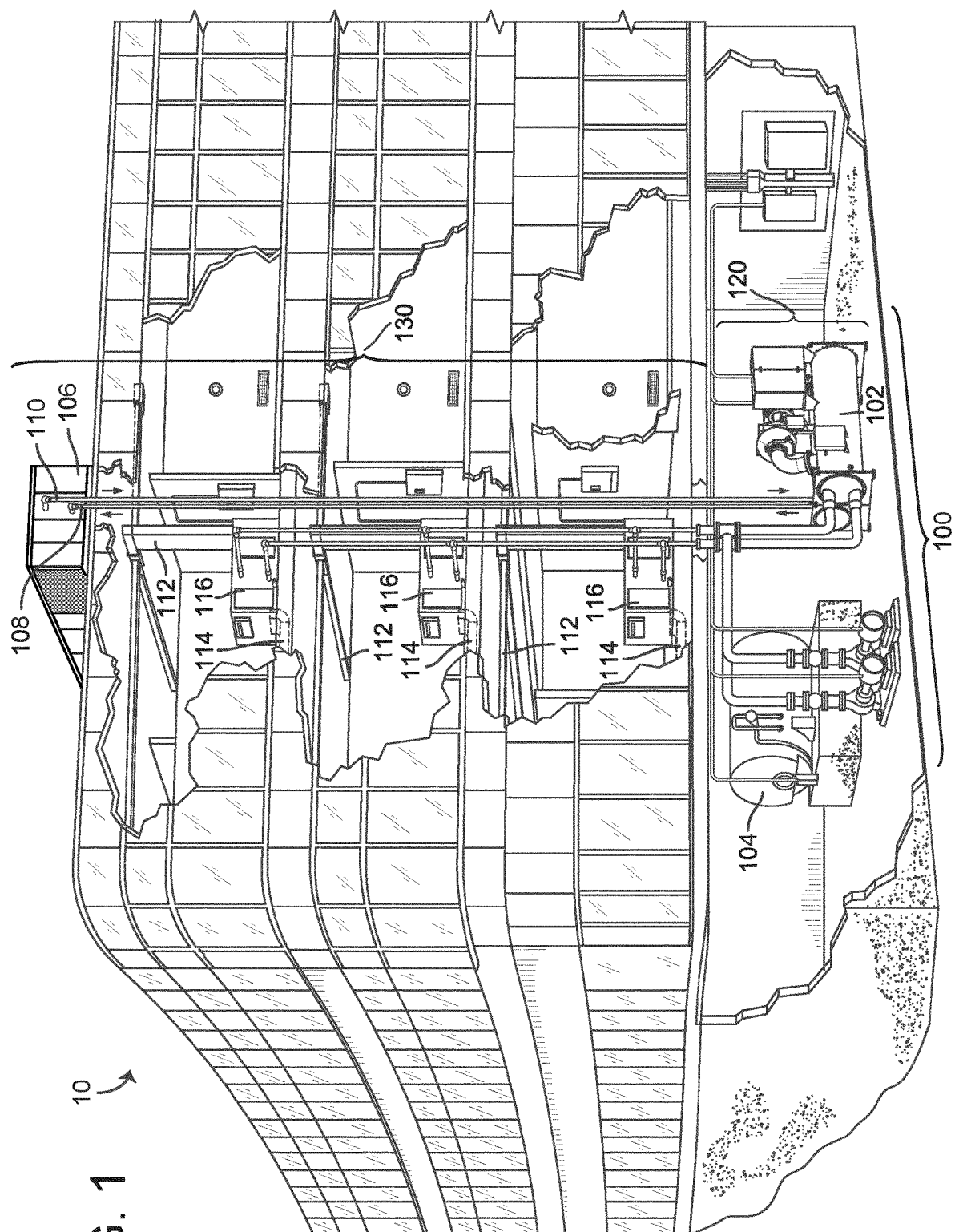
FIG. 1 is a drawing of a building with a heating, ventilation, or air conditioning (HVAC) system, according to some embodiments.

Referring now to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
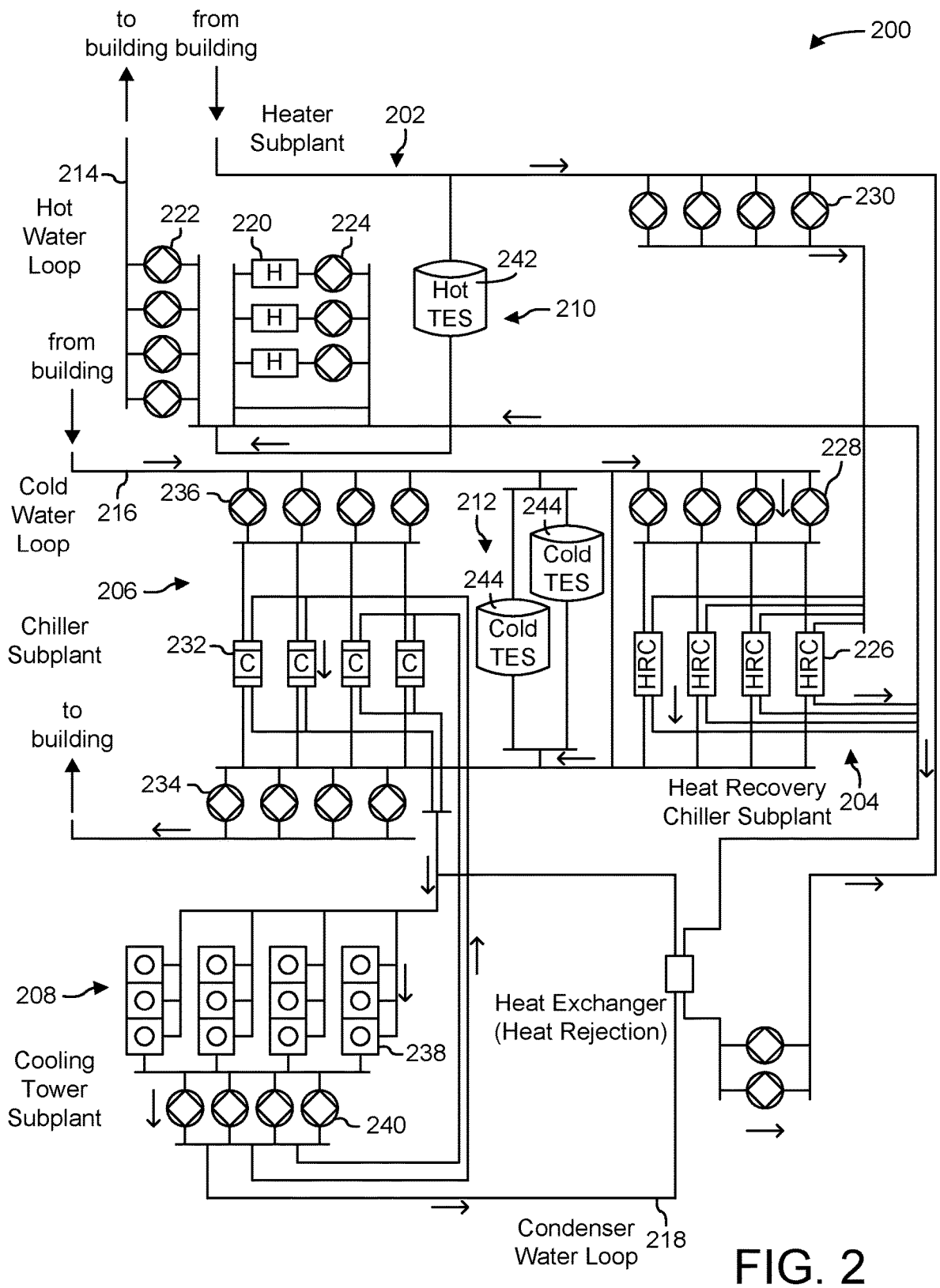
FIG. 2 is a schematic of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Airside System

Figure 3:
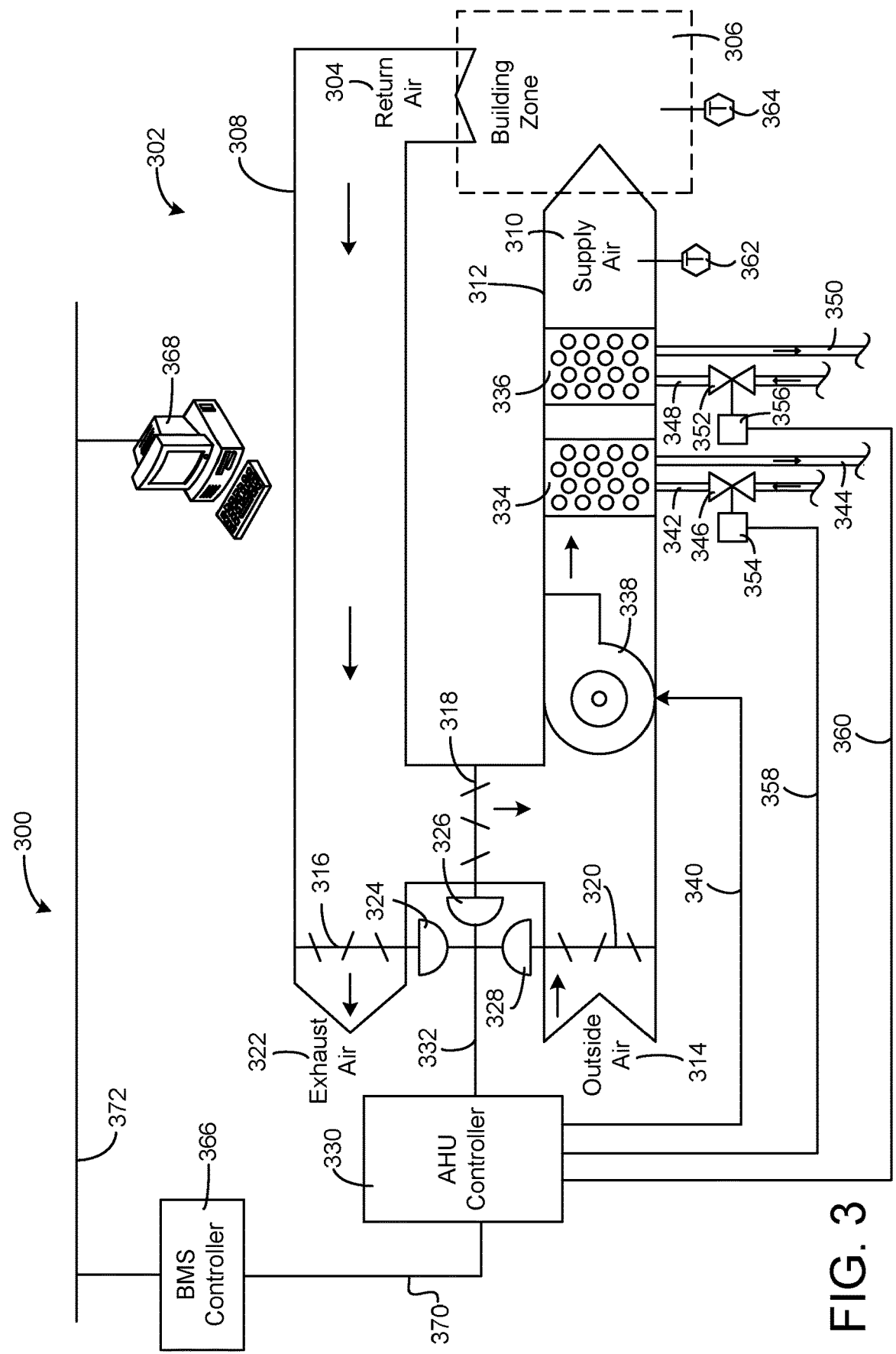
FIG. 3 is a diagram of an airside system, which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management System

Figure 4:
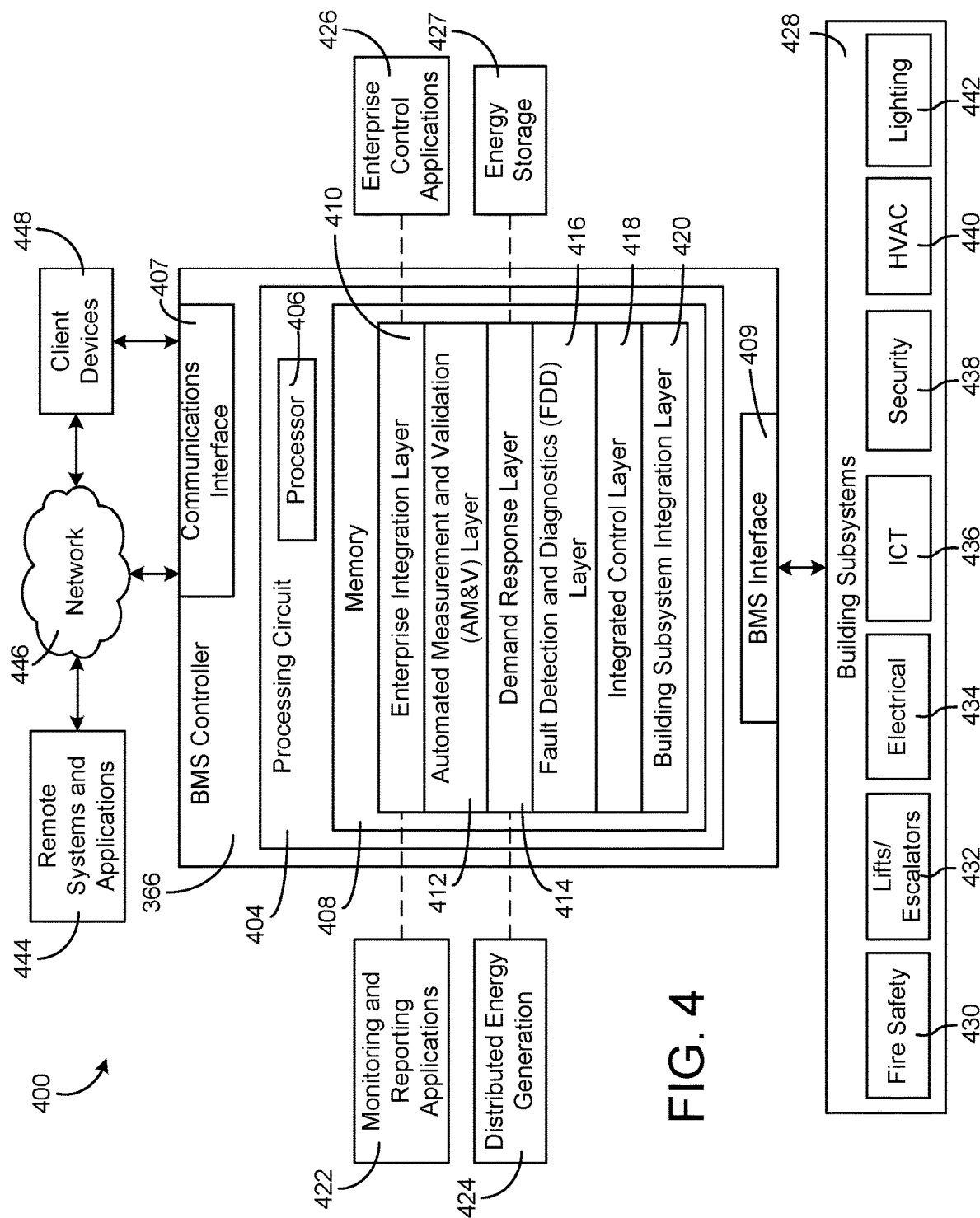
FIG. 4 is a block diagram of a building management system (BMS) which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing set points, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing set points) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what set points can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Fault-Adaptive Control Schema with Model Predictive Control

Referring generally to FIGS. 5-8 various systems and methods for automatically adjusting and automatically adjusting or adapting a predictive model to compensate for detected fault conditions in an HVAC system are shown, according to some embodiments. In some embodiments, one or more processing components (e.g., fault adaptive controller 802, etc.) adjusts control schema used to control one or more HVAC systems (e.g., HVAC system 100, central plant 200, airside system 300, BMS 400, HVAC system 500, etc.) based on determining fault conditions (e.g., sensor faults, actuator faults, etc.). The adjustments to the control schema may include adjusting a virtual model (e.g., digital twin, system model, mathematical model, predictive model, etc.) used for control purposes based on the detected fault condition, re-designing the model after receiving the detected fault condition, incorporating the fault condition into the virtual model, or any combination thereof. Further details regarding detected fault conditions and adjustments to the control schemas responsive to the detected fault conditions are described in greater detail below.

HVAC System and Model

Figure 5:
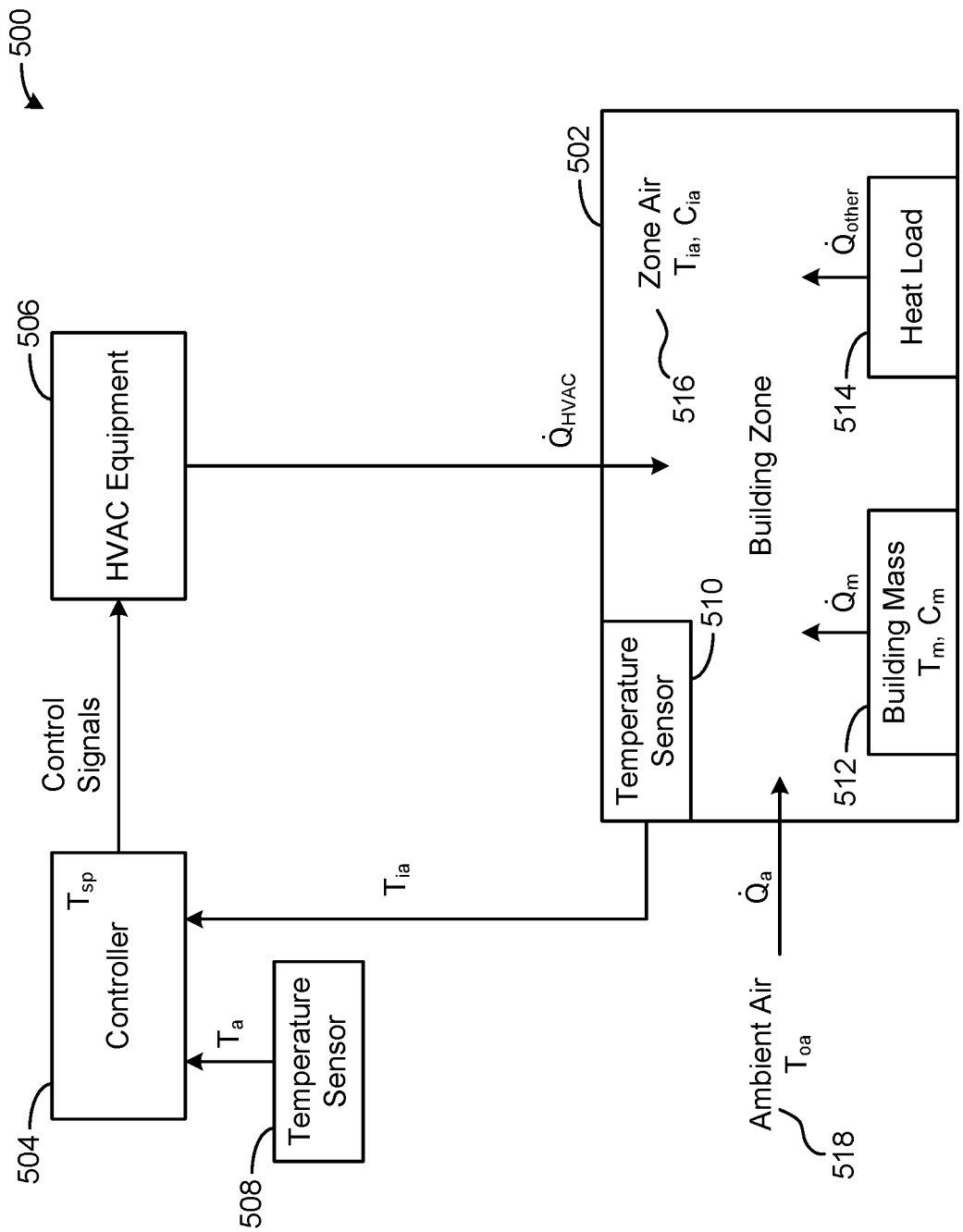
FIG. 5 is a block diagram illustrating several sources of heat transfer affecting a building zone within the building of FIG. 1, according to some embodiments.
Figure 6:
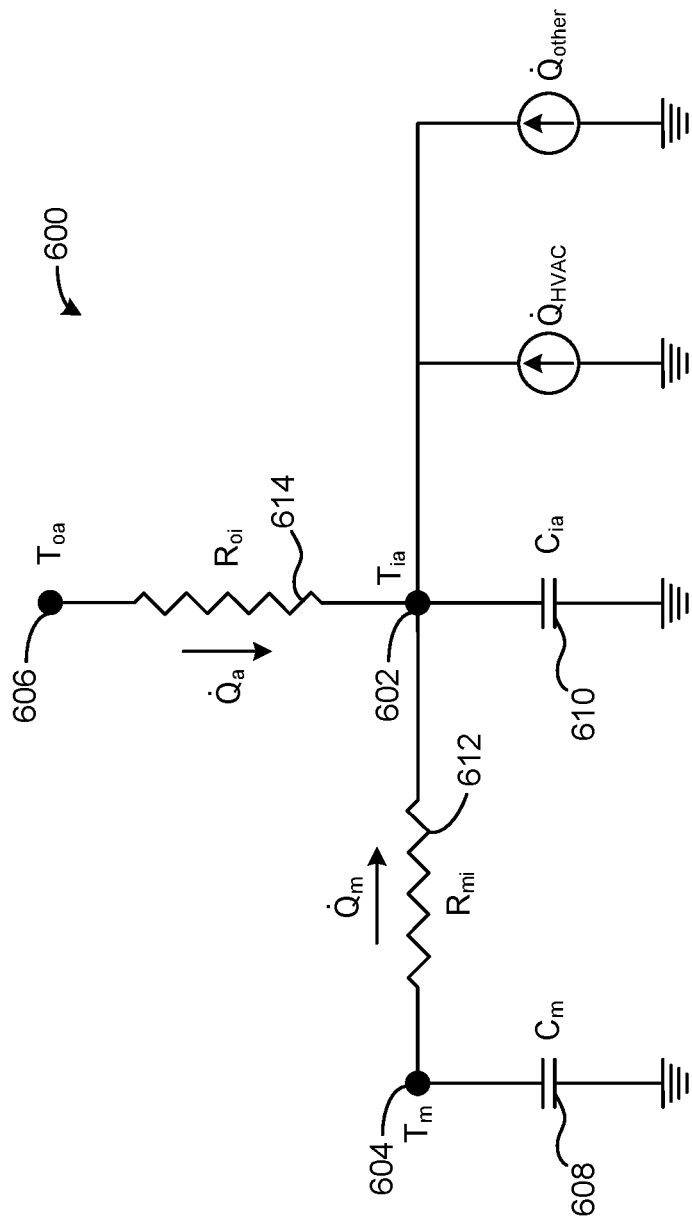
FIG. 6 is a thermal circuit diagram illustrating several sources of heat transfer affecting the building zone of FIG. 2, according to some embodiments.

Referring now to FIGS. 5-6, a block diagram of a HVAC system 500 and thermal circuit diagram 600 illustrating several sources of heat transfer that affect the temperature within a building zone 502 are shown, according to an exemplary embodiment. Zone 202 may be located within building 10 and may include a room, a set of rooms, a floor, a space, or any other location within building 10. In some embodiments, zone 502 refers to any instance or location within building 10 that includes a single control loop or multiple control loops. In some embodiments, zone 502 refers to any building location with one or more HVAC units and/or HVAC equipment (e.g., boilers, AC units, chillers, etc.) implemented within one or more control loops. Zone 502 may be served by HVAC equipment 506, which may include some or all of the equipment of HVAC system 100, central plant 200, airside system 300, or BMS 400 (e.g., boilers, chillers, air handling units, etc.), as described with reference to FIGS. 1-4. HVAC equipment 506 may operate to provide heating or cooling $\dot{Q}_{HVAC}$ to zone 502 to maintain the temperature $T_z$ of zone 502 at or near a desired temperature (e.g., at a temperature setpoint, within a setpoint range, etc.) to promote the comfort of occupants within zone 502 and/or to meet other needs of zone 502. $\dot{Q}_{HVAC}$ may include heat flow into zone 502 when HVAC equipment 506 operate in a heating mode or heat flow out of zone 502 when HVAC equipment 506 operate in a cooling mode. $\dot{Q}_{HVAC}$ may have a positive value when HVAC equipment 506 operate in the heating mode and a negative value when HVAC equipment 506 operate in the cooling mode. HVAC system 500 and the various components therein may include any and all functionality from the systems and methods disclosed in U.S. patent application Ser. No. 16/906,562 filed Jun. 19, 2020, the entire disclosure of which is incorporated by reference herein.

Zone air 516 includes air within zone 502 and can be modeled as having a zone air temperature $T_{ia}$ and a thermal capacitance $C_{ia}$, shown in diagram 600 as temperature node 602 and thermal capacitor 610 respectively. Zone air temperature $T_{ia}$ is affected by several sources of heat transfer including heating or cooling $\dot{Q}_{HVAC}$ provided by HVAC equipment 506, heat $\dot{Q}_m$ exchanged between zone air 516 and building mass 512, heat $\dot{Q}_a$ exchanged between zone air 516 and ambient air 518 outside zone 502, and heat $\dot{Q}_{other}$ generated by heat load 514 within zone 502. A temperature sensor 510 may be positioned within zone 502 and configured to measure the zone air temperature $T_{ia}$. Temperature sensor 510 may communicate the zone air temperature $T_{ia}$ to a controller 504, which operates to control HVAC equipment 506.

Building mass 512 includes non-air mass within zone 502 (e.g., walls, floors, ceilings, furniture, solid objects, etc.) which can exchange heat $\dot{Q}_m$ with zone air 516. Building mass 512 can be modeled as having a mass temperature $T_m$ and a thermal capacitance $C_m$, shown in diagram 600 as temperature node 604 and thermal capacitor 608 respectively. Building mass 512 may reject heat $\dot{Q}_m$ to zone air 516 when the mass temperature $T_m$ is greater than the zone air temperature $T_{ia}$ or may absorb heat $\dot{Q}_m$ from zone air 516 when the mass temperature $T_m$ is less than the zone air temperature $T_{ia}$. Accordingly, the value of $\dot{Q}_m$ may be positive when building mass 512 rejects heat to zone air 516 and negative when building mass 512 absorbs heat from zone air 516. The thermal resistance $R_{mz}$ between building mass 512 and zone air 516 may be represented as a thermal resistor 612 as shown in diagram 600.

Heat load 514 may include occupants within zone 502 (e.g., people, animals, etc.) that produce body heat as well as computers, lighting, and/or other electronic devices that generate heat through electrical resistance. In some embodiments, heat load 514 includes sunlight that transfers heat into zone via solar irradiance or other sources of heat transfer into zone 502 via thermal radiation. The total amount of heat generated by heat load 514 can be modeled as $\dot{Q}_{other}$.

Ambient air 518 may include outdoor air or air within another building zone that exchanges heat $\dot{Q}_a$ with zone air 516. The temperature $T_{oa}$ of ambient air 518 (represented by temperature node 606 in diagram 600) may be measured by a temperature sensor 508 and provided as an input to controller 504. Ambient air 518 may reject heat $\dot{Q}_a$ to zone air 516 when the ambient air temperature $T_{oa}$ is greater than the zone air temperature $T_{ia}$ or may absorb heat $\dot{Q}_a$ from zone air 516 when the ambient air temperature $T_{oa}$ is less than the zone air temperature $T_{ia}$. Accordingly, the value of $\dot{Q}_a$ may be positive when ambient air 518 rejects heat to zone air 516 or negative when ambient air 518 absorbs heat from zone air 516. The thermal resistance $R_{az}$ between ambient air 518 and zone air 516 is represented by a thermal resistor 614 and may depend on the barriers to heat transfer at the perimeter of building zone 502 (e.g., wall insulation, closed windows, etc.).

Controller 504 receives the temperature measurements $T_{ia}$ and $T_{oa}$ from sensors 508-510 and provides control signals to HVAC equipment 506. In some embodiments, the control signals include heating or cooling duties for HVAC equipment 506. Advantageously, controller 504 may consider the sources of heat transfer provided by heat load 514 (i.e., $\dot{Q}_{other}$), building mass 512 (i.e., $\dot{Q}_m$), and ambient air 518 (i.e., $\dot{Q}_a$) on the zone air temperature $T_z$ and may operate HVAC equipment 506 to provide a suitable amount of heating or cooling $\dot{Q}_{HVAC}$ to maintain the zone air temperature $T_{ia}$ within an acceptable range. The operation of controller 504 is discussed in greater detail below.

Although FIG. 5 shows a single building zone, the systems and methods described herein are also applicable to multi-zone systems. In the case of a multi-zone system, each zone would have its own values of $T_{ia}$, $C_{ia}$, $T_m$, and $C_m$, which could be aggregated or averaged to determine the value to use in the model.

Referring particularly to FIG. 6, diagram 600 models zone 502 as a two thermal resistance, two thermal capacitance, control-oriented thermal mass system. This model can be characterized by the following system of linear differential equations:

$$C_{ia}\dot{T}_{ia} = \frac{1}{R_{mi}}(T_m - T_{ia}) + \frac{1}{R_{oi}}(T_{oa} - T_{ia}) + \dot{Q}_{HVAC} + \dot{Q}_{other} \quad \text{(Eq. 1)}$$

$$C_m\dot{T}_m = \frac{1}{R_{mi}}(T_{ia} - T_m) \quad \text{(Eq. 2)}$$

where Eq. 1 models the temperature $T_{ia}$ of zone air 516 and Eq. 2 models the temperature $T_m$ of building mass 512.

In some embodiments, various other notations for describing heat transfer that affects the temperature within a building zone may be considered. For example, zone air 516 includes air within zone 502 and can be modeled as having a zone air temperature $T_z$ and a thermal capacitance $C_z$, shown in diagram 600 as temperature node 602 and thermal capacitor 610 respectively. In another example, ambient (e.g., outside) air temperature may be modeled as $T_a$. In such embodiments, the model can be characterized by the following system of linear differential equations:

$$C_z \dot{T}_z = \frac{1}{R_{mz}}(T_m - T_z) + \frac{1}{R_{az}}(T_a - T_z) + \dot{Q}_{HVAC} + \dot{Q}_{other} \quad \text{(Eq. 3)}$$

$$C_m \dot{T}_m = \frac{1}{R_{mz}}(T_z - T_m) \quad \text{(Eq. 4)}$$

where Eq. 3 models the temperature $T_z$ of zone air 216 and Eq. 4 models the temperature $T_m$ of building mass 512. Controller 504 may use these equations (e.g., state-space models based on these equations) to generate the control signals for HVAC equipment 506. It is noted that $T_z$ is equivalent to $T_{ia}$, $T_a$ is equivalent to $T_{oa}$, $R_{mi}$ is equivalent to $R_{mi}$, and $R_{az}$ is equivalent to $R_{ai}$, and the equivalent pairs of variables are used interchangeably throughout the present disclosure.

Each term in Eq. 1 corresponds to a branch of diagram 600. Zone air temperature node 602 represents the zone air temperature $T_{ia}$. From zone air temperature node 602, diagram 600 branches in several directions, including down to a ground via thermal capacitor 610 having a thermal capacitance of $C_{ia}$. Thermal capacitor 610 models the ability of zone air 516 store heat (i.e., the amount of heat needed to change the zone air temperature $T_{ia}$ by a given amount) and is associated with the rate of change $\dot{T}_{ia}$ of the zone air temperature $T_{ia}$. The product of the thermal capacitance $C_z$ of zone air 516 and the rate of change of the temperature $T_z$ of zone air 516 (i.e., $C_z \dot{T}_z$) forms the left side of Eq. 1.

From zone air temperature node 602, diagram 600 also branches left to building mass temperature node 604, which corresponds to the temperature $T_m$ of building mass 212. A thermal resistor 312 having a thermal resistance of $R_{mi}$ separates zone air temperature node 602 and building mass temperature node 604. The heat transfer $\dot{Q}_m$ from building mass 512 to zone air 516 (or vice versa) is equivalent to the term $$\frac{1}{R_{mi}}(T_m - T_{ia})$$

in the first equation (Eq. 1). This term is included on the right side of the Eq. 1 as contributing to the rate of change of the zone air temperature $\dot{T}_z$.

From zone air temperature node 602, diagram 600 also branches up to ambient air temperature node 606, which corresponds to the temperature $T_{oa}$ of ambient air 518. A thermal resistor 614 having a thermal resistance of $R_{oi}$ separates zone air temperature node 602 and ambient air temperature node 606. The heat transfer $\dot{Q}_a$ from ambient air 518 to zone air 516 (or vice versa) is equivalent to the term $$\frac{1}{R_{oi}}(T_a - T_z)$$

in Eq. 1. This term is included on the right side of the Eq. 1 as contributing to the rate of change of the zone air temperature $\dot{T}_z$.

Also from zone air temperature node 602, diagram 600 branches right to two heat sources $\dot{Q}_{HVAC}$ and $\dot{Q}_{other}$. As discussed above, $\dot{Q}_{other}$ represents heat flow into zone 502 from heat load 514, whereas $\dot{Q}_{HVAC}$ represents heat flow into zone 502 from HVAC equipment 506. In some embodiments, $\dot{Q}_{other}$ is not measured or controlled by HVAC equipment 506 or controller 504, yet contributes to the rate of change of the zone air temperature $T_{ia}$. Controller 504 may use a disturbance model to predict the values of $\dot{Q}_{other}$, as described in greater detail below. Conversely, $\dot{Q}_{HVAC}$ is generated by HVAC equipment 506 and can be controlled by controller 504 as needed to manage the zone air temperature $T_{ia}$. Both $\dot{Q}_{HVAC}$ and $\dot{Q}_{other}$ are included on the right side of Eq. 1 as contributing to the rate of change of the zone air temperature $\dot{T}_z$.

The second equation (Eq. 2) models the rate of change $\dot{T}_m$ of the building mass temperature $T_m$. Thermal capacitor 608 models the ability of building mass 512 store heat (i.e., the amount of heat needed to change the building mass temperature $T_m$ by a given amount) and is associated with the rate of change $\dot{T}_m$ of the building mass temperature $T_m$. The product of the thermal capacitance $C_m$ of building mass 512 and the rate of change of the temperature $T_m$ of building mass 512 (i.e., $C_m \dot{T}_m$) forms the left side of Eq. 2. The heat transfer $\dot{Q}_m$ from zone air 516 to building mass 512 (or vice versa) is equivalent to the term $$\frac{1}{R_{mi}}(T_{ia} - T_m)$$

in Eq. 2. This term is included on the right side of the Eq. 2 as contributing to the rate of change of the building mass temperature $\dot{T}_m$.

Eq. 1 and Eq. 2 can be divided by $C_{ia}$ and $C_m$ respectively and rewritten in state-space form as shown in the following equation:

$$\begin{bmatrix} \dot{T}_{ia} \\ \dot{T}_m \end{bmatrix} = \begin{bmatrix} -\left(\frac{1}{C_{ia}R_{mi}} + \frac{1}{C_{ia}R_{oi}}\right) & \frac{1}{C_{ia}R_{mi}} \\ \frac{1}{C_m R_{mi}} & -\frac{1}{C_m R_{mi}} \end{bmatrix} \begin{bmatrix} T_{ia} \\ T_m \end{bmatrix} + \begin{bmatrix} \frac{1}{C_{ia}} & \frac{1}{C_{ia}R_{oi}} & \frac{1}{C_{ia}} \\ 0 & 0 & 0 \end{bmatrix} \begin{bmatrix} \dot{Q}_{HVAC} \\ T_a \\ \dot{Q}_{other} \end{bmatrix} \quad \text{(Eq. 5)}$$

where $\dot{T}_{ia}$ is the rate of change of the zone air temperature $T_{ia}$, $\dot{T}_m$ is the rate of change of the building mass temperature $T_m$, $R_{mi}$ is the thermal resistance between building mass 512 and zone air 516, $C_m$ is the thermal capacitance of building mass 512 (e.g., Joules/° C.), $C_z$ is the thermal capacitance of zone air 516 (e.g., Joules/° C.), $R_{oi}$ is the thermal resistance between ambient air 518 and zone air 516, $T_{ia}$ is the temperature of zone air 516, $T_m$ is the temperature of building mass 512, $\dot{Q}_{HVAC}$ indicates heating or cooling contributed by HVAC equipment 506, $T_{oa}$ is the temperature of ambient air 518, and $\dot{Q}_{other}$ is the heat generated by heat load 514.

In some embodiments, the various systems and methods described herein regarding heat transfer that affects the temperature within a building zone may include features, systems, and/or methods described in U.S. patent application Ser. No. 16/906,562 filed Jun. 19, 2020, the entire disclosure of which is incorporated by reference herein.

HVAC System with Asset Allocation Features

Figure 7:
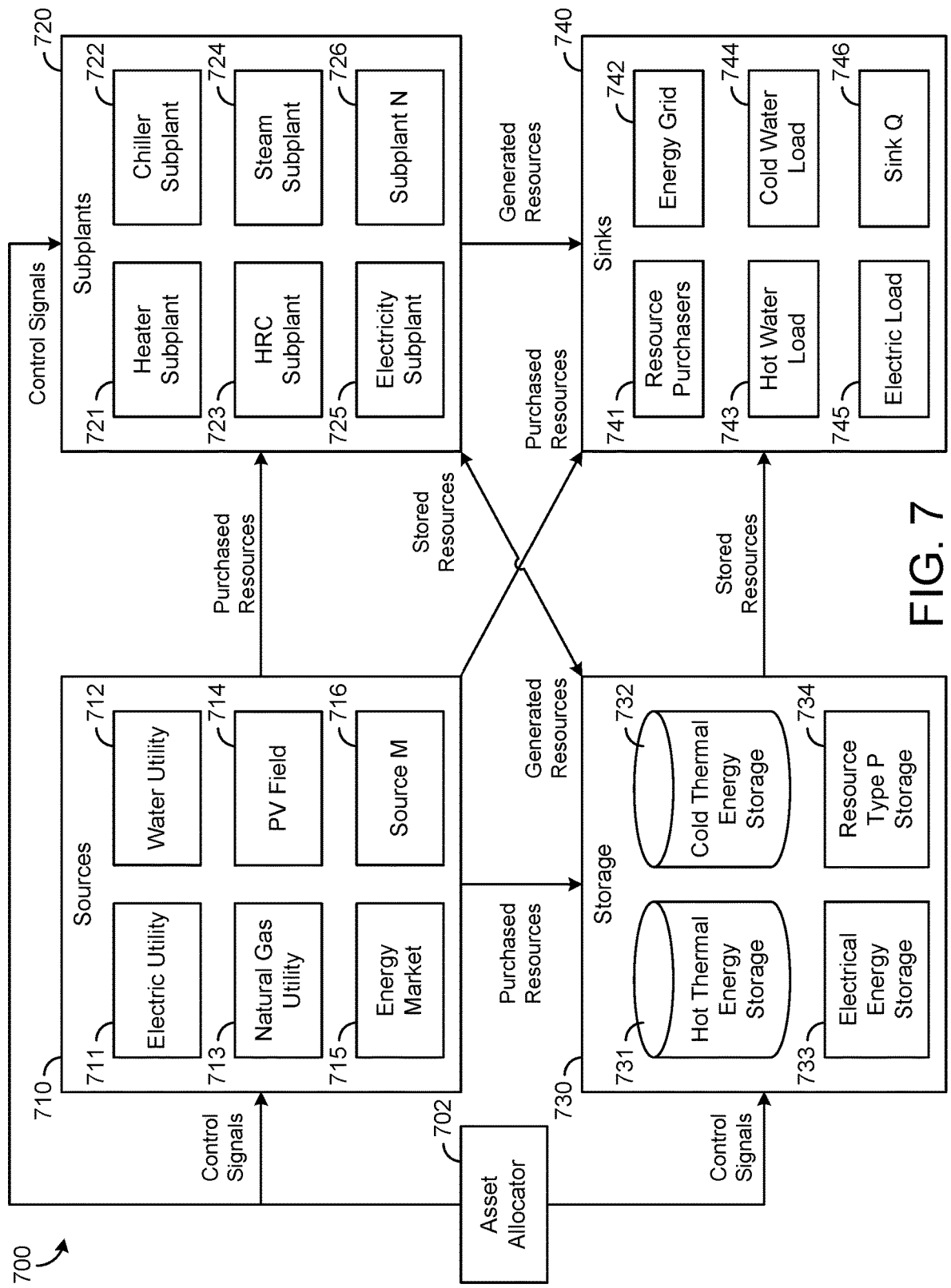
FIG. 7 is a block diagram of an asset allocation system including sources, subplants, storage, sinks and an asset allocator configured to optimize the allocation of these assets, according to some embodiments.

Referring now to FIG. 7, a block diagram of an asset allocation system 700 is shown, according to an exemplary embodiment. Asset allocation system 700 can be configured to manage energy assets such as central plant equipment, battery storage, and other types of equipment configured to serve the energy loads of a building. Asset allocation system 700 can determine an optimal distribution of heating, cooling, electricity, and energy loads across different subplants (i.e., equipment groups) capable of producing that type of energy. In some embodiments, asset allocation system 700 is implemented as a component of central plant 200 and interacts with the equipment of central plant 200 in an online operational environment (e.g., performing real-time control of the central plant equipment). In other embodiments, asset allocation system 700 can be implemented as a component of a planning tool (described with reference to FIGS. 7-8) and can be configured to simulate the operation of a central plant over a predetermined time period for planning, budgeting, and/or design considerations. Asset allocation system 700 may include various components and/or functionality from systems and methods described in U.S. Pat. No. 10,706,375 granted Jul. 7, 2020, the entire disclosure of which is incorporated by reference herein.

Asset allocation system 700 is shown to include sources 710, subplants 720, storage 730, and sinks 740. These four categories of objects define the assets of a central plant and their interaction with the outside world. Sources 710 may include commodity markets or other suppliers from which resources such as electricity, water, natural gas, and other resources can be purchased or obtained. Sources 710 may provide resources that can be used by asset allocation system 700 to satisfy the demand of a building or campus. For example, sources 710 are shown to include an electric utility 711, a water utility 712, a natural gas utility 713, a photovoltaic (PV) field (e.g., a collection of solar panels), an energy market 715, and source M 716, where M is the total number of sources 710. Resources purchased from sources 710 can be used by subplants 720 to produce generated resources (e.g., hot water, cold water, electricity, steam, etc.), stored in storage 730 for later use, or provided directly to sinks 740.

Subplants 720 are the main assets of a central plant. Subplants 720 are shown to include a heater subplant 721, a chiller subplant 722, a heat recovery chiller subplant 723, a steam subplant 724, an electricity subplant 725, and subplant N, where N is the total number of subplants 720. In some embodiments, subplants 720 include some or all of the subplants of central plant 200, as described with reference to FIG. 2. For example, subplants 720 can include heater subplant 202, heat recovery chiller subplant 204, chiller subplant 206, and/or cooling tower subplant 208.

Subplants 720 can be configured to convert resource types, making it possible to balance requested loads from the building or campus using resources purchased from sources 710. For example, heater subplant 721 may be configured to generate hot thermal energy (e.g., hot water) by heating water using electricity or natural gas. Chiller subplant 722 may be configured to generate cold thermal energy (e.g., cold water) by chilling water using electricity. Heat recovery chiller subplant 723 may be configured to generate hot thermal energy and cold thermal energy by removing heat from one water supply and adding the heat to another water supply. Steam subplant 724 may be configured to generate steam by boiling water using electricity or natural gas. Electricity subplant 725 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 720 may be provided by sources 710, retrieved from storage 730, and/or generated by other subplants 720. For example, steam subplant 724 may produce steam as an output resource. Electricity subplant 725 may include a steam turbine that uses the steam generated by steam subplant 724 as an input resource to generate electricity. The output resources produced by subplants 720 may be stored in storage 730, provided to sinks 740, and/or used by other subplants 720. For example, the electricity generated by electricity subplant 725 may be stored in electrical energy storage 733, used by chiller subplant 722 to generate cold thermal energy, used to satisfy the electric load 745 of a building, or sold to resource purchasers 741.

Storage 730 can be configured to store energy or other types of resources for later use. Each type of storage within storage 730 may be configured to store a different type of resource. For example, storage 730 is shown to include hot thermal energy storage 731 (e.g., one or more hot water storage tanks), cold thermal energy storage 732 (e.g., one or more cold thermal energy storage tanks), electrical energy storage 733 (e.g., one or more batteries), and resource type P storage 434, where P is the total number of storage 730. In some embodiments, storage 730 include some or all of the storage of central plant 200, as described with reference to FIG. 2. In some embodiments, storage 730 includes the heat capacity of the building served by the central plant. The resources stored in storage 730 may be purchased directly from sources or generated by subplants 720.

In some embodiments, storage 730 is used by asset allocation system 700 to take advantage of price-based demand response (PBDR) programs. PBDR programs encourage consumers to reduce consumption when generation, transmission, and distribution costs are high. PBDR programs are typically implemented (e.g., by sources 710) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 730 allows for the resources to be purchased at times when the resources are relatively less expensive (e.g., during non-peak electricity hours) and stored for use at times when the resources are relatively more expensive (e.g., during peak electricity hours). Storing resources in storage 730 also allows the resource demand of the building or campus to be shifted in time. For example, resources can be purchased from sources 710 at times when the demand for heating or cooling is low and immediately converted into hot or cold thermal energy by subplants 720. The thermal energy can be stored in storage 730 and retrieved at times when the demand for heating or cooling is high. This allows asset allocation system 700 to smooth the resource demand of the building or campus and reduces the maximum required capacity of subplants 720. Smoothing the demand also asset allocation system 700 to reduce the peak electricity consumption, which results in a lower demand charge.

In some embodiments, storage 730 is used by asset allocation system 700 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 710 or by an independent service operator (ISO). IBDR programs supplement traditional utility-owned generation, transmission, and distribution assets with additional options for modifying demand load curves. For example, stored energy can be sold to resource purchasers 741 or an energy grid 742 to supplement the energy generated by sources 710. In some instances, incentives for participating in an IBDR program vary based on how quickly a system can respond to a request to change power output/consumption. Faster responses may be compensated at a higher level. Advantageously, electrical energy storage 733 allows system 700 to quickly respond to a request for electric power by rapidly discharging stored electrical energy to energy grid 742.

Sinks 740 may include the requested loads of a building or campus as well as other types of resource consumers. For example, sinks 740 are shown to include resource purchasers 741, an energy grid 742, a hot water load 443, a cold water load 744, an electric load 745, and sink Q, where Q is the total number of sinks 740. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 740 over the optimization period can be supplied as an input to asset allocation system 700 or predicted by asset allocation system 700. Sinks 740 can receive resources directly from sources 710, from subplants 720, and/or from storage 730.

Still referring to FIG. 4, asset allocation system 700 is shown to include an asset allocator 702. Asset allocator 702 may be configured to control the distribution, production, storage, and usage of resources in asset allocation system 700. In some embodiments, asset allocator 702 performs an optimization process determine an optimal set of control decisions for each time step within an optimization period. The control decisions may include, for example, an optimal amount of each resource to purchase from sources 710, an optimal amount of each resource to produce or convert using subplants 720, an optimal amount of each resource to store or remove from storage 730, an optimal amount of each resource to sell to resources purchasers 741 or energy grid 440, and/or an optimal amount of each resource to provide to other sinks 740. In some embodiments, the control decisions include an optimal amount of each input resource and output resource for each of subplants 720.

In some embodiments, asset allocator 702 is configured to optimally dispatch all campus energy assets in order to meet the requested heating, cooling, and electrical loads of the campus for each time step within an optimization horizon or optimization period of duration h. Instead of focusing on only the typical HVAC energy loads, the concept is extended to the concept of resource. Throughout this disclosure, the term "resource" is used to describe any type of commodity purchased from sources 710, used or produced by subplants 720, stored or discharged by storage 730, or consumed by sinks 740. For example, water may be considered a resource that is consumed by chillers, heaters, or cooling towers during operation. This general concept of a resource can be extended to chemical processing plants where one of the resources is the product that is being produced by the chemical processing plat.

Asset allocator 702 can be configured to operate the equipment of asset allocation system 700 to ensure that a resource balance is maintained at each time step of the optimization period. This resource balance is shown in the following equation:

$$\sum x_{time} = 0 \, \forall \text{resources}, \forall \text{time} \in \text{horizon} \quad \text{(Eq. 6)}$$

where the sum is taken over all producers and consumers of a given resource (i.e., all of sources 710, subplants 720, storage 730, and sinks 740) and time is the time index. Each time element represents a period of time during which the resource productions, requests, purchases, etc. are assumed constant. Asset allocator 702 may ensure that this equation is satisfied for all resources regardless of whether that resource is required by the building or campus. For example, some of the resources produced by subplants 720 may be intermediate resources that function only as inputs to other subplants 720.

In some embodiments, the resources balanced by asset allocator 702 include multiple resources of the same type (e.g., multiple chilled water resources, multiple electricity resources, etc.). Defining multiple resources of the same type may allow asset allocator 702 to satisfy the resource balance given the physical constraints and connections of the central plant equipment. For example, suppose a central plant has multiple chillers and multiple cold water storage tanks, with each chiller physically connected to a different cold water storage tank (i.e., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 702 to ensure that the resource balance is satisfied for each cold water resource without attempting to allocate resources in a way that is physically impossible (e.g., storing the output of chiller A in cold water storage tank B, etc.).

Asset allocator 702 may be configured to minimize the economic cost (or maximize the economic value) of operating asset allocation system 700 over the duration of the optimization period. The economic cost may be defined by a cost function J(x) that expresses economic cost as a function of the control decisions made by asset allocator 702. The cost function J(x) may account for the cost of resources purchased from sources 710, as well as the revenue generated by selling resources to resource purchasers 741 or energy grid 742 or participating in incentive programs. The cost optimization performed by asset allocator 702 can be expressed as:

$$\arg\min_{x} J(x)$$

where J(x) is defined as follows:

$$J(x) = \sum_{sources} \sum_{horizon} \text{cost}(purchase_{resource,time}, \text{time}) - \sum_{incentives} \sum_{horizon} \text{revenue}(ReservationAmount) \quad \text{(Eq. 7)}$$

The first term in the cost function J(x) represents the total cost of all resources purchased over the optimization horizon. Resources can include, for example, water, electricity, natural gas, or other types of resources purchased from a utility or other source 410. The second term in the cost function J(x) represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Each of subplants 720 and storage 730 may include equipment that can be controlled by asset allocator 702 to optimize the performance of asset allocation system 700. Subplant equipment may include, for example, heating devices, chillers, heat recovery heat exchangers, cooling towers, energy storage devices, pumps, valves, and/or other devices of subplants 720 and storage 730. Individual devices of subplants 720 can be turned on or off to adjust the resource production of each subplant 420. In some embodiments, individual devices of subplants 720 can be operated at variable capacities (e.g., operating a chiller at 10% capacity or 60% capacity) according to an operating setpoint received from asset allocator 702. Asset allocator 702 can control the equipment of subplants 720 and storage 730 to adjust the amount of each resource purchased, consumed, and/or produced by system 400.

In some embodiments, asset allocator 702 minimizes the cost function while participating in PBDR programs, IBDR programs, or simultaneously in both PBDR and IBDR programs. For the IBDR programs, asset allocator 702 may use statistical estimates of past clearing prices, mileage ratios, and event probabilities to determine the revenue generation potential of selling stored energy to resource purchasers 741 or energy grid 742. For the PBDR programs, asset allocator 702 may use predictions of ambient conditions, facility thermal loads, and thermodynamic models of installed equipment to estimate the resource consumption of subplants 720. Asset allocator 702 may use predictions of the resource consumption to monetize the costs of running the equipment.

Asset allocator 702 may automatically determine (e.g., without human intervention) a combination of PBDR and/or IBDR programs in which to participate over the optimization horizon in order to maximize economic value. For example, asset allocator 702 may consider the revenue generation potential of IBDR programs, the cost reduction potential of PBDR programs, and the equipment maintenance/replacement costs that would result from participating in various combinations of the IBDR programs and PBDR programs. Asset allocator 702 may weigh the benefits of participation against the costs of participation to determine an optimal combination of programs in which to participate. Advantageously, this allows asset allocator 702 to determine an optimal set of control decisions that maximize the overall value of operating asset allocation system 700.

In some embodiments, asset allocator 702 optimizes the cost function J(x) subject to the following constraint, which guarantees the balance between resources purchased, produced, discharged, consumed, and requested over the optimization horizon:

$$\sum_{sources} purchase_{resource,time} + \qquad (Eq.\ 8)$$

$$\sum_{subplants} produces\ (x_{internal,time}, x_{external,time}, v_{uncontrolled,time}) -$$

-continued $$\sum_{subplants} consumes\ (x_{internal,time}, x_{external,time}, v_{uncontrolled,time}) +$$

$$\sum_{storages} discharges_{resource}(x_{internal,time}, x_{external,time}) -$$

$$\sum_{sinks} requests_{resource} = 0 \quad \forall\ resources,\ \forall\ time \in horizon$$

where $x_{internal,time}$ includes internal decision variables (e.g., load allocated to each component of asset allocation system 700), $x_{external,time}$ includes external decision variables (e.g., condenser water return temperature or other shared variables across subplants 720), and $v_{uncontrolled,time}$ includes uncontrolled variables (e.g., weather conditions).

The first term in the previous equation represents the total amount of each resource (e.g., electricity, water, natural gas, etc.) purchased from each source 710 over the optimization horizon. The second and third terms represent the total production and consumption of each resource by subplants 720 over the optimization horizon. The fourth term represents the total amount of each resource discharged from storage 730 over the optimization horizon. Positive values indicate that the resource is discharged from storage 730, whereas negative values indicate that the resource is charged or stored. The fifth term represents the total amount of each resource requested by sinks 740 over the optimization horizon. Accordingly, this constraint ensures that the total amount of each resource purchased, produced, or discharged from storage 730 is equal to the amount of each resource consumed, stored, or provided to sinks 740.

In some embodiments, additional constraints exist on the regions in which subplants 720 can operate. Examples of such additional constraints include the acceptable space (i.e., the feasible region) for the decision variables given the uncontrolled conditions, the maximum amount of a resource that can be purchased from a given source 410, and any number of plant-specific constraints that result from the mechanical design of the plant.

Asset allocator 702 may include a variety of features that enable the application of asset allocator 702 to nearly any central plant, central energy facility, combined heating and cooling facility, or combined heat and power facility. These features include broadly applicable definitions for subplants 720, sinks 740, storage 730, and sources 710; multiples of the same type of subplant 420 or sink 740; subplant resource connections that describe which subplants 720 can send resources to which sinks 740 and at what efficiency; subplant minimum turndown into the asset allocation optimization; treating electrical energy as any other resource that must be balanced; constraints that can be commissioned during runtime; different levels of accuracy at different points in the horizon; set points (or other decisions) that are shared between multiple subplants included in the decision vector; disjoint subplant operation regions; incentive based electrical energy programs; and high level airside models. Incorporation of these features may allow asset allocator 702 to support a majority of the central energy facilities that will be seen in the future. Additionally, it will be possible to rapidly adapt to the inclusion of new subplant types. Some of these features are described in greater detail below.

Broadly applicable definitions for subplants 720, sinks 740, storage 730, and sources 710 allow each of these components to be described by the mapping from decision variables to resources consume and resources produced. Resources and other components of system 400 do not need to be "typed," but rather can be defined generally. The mapping from decision variables to resource consumption and production can change based on extrinsic conditions. Asset allocator 420 can solve the optimization problem by simply balancing resource use and can be configured to solve in terms of consumed resource 1, consumed resource 2, produced resource 1, etc., rather than electricity consumed, water consumed, and chilled water produced. Such an interface at the high level allows for the mappings to be injected into asset allocation system 700 rather than needing them hard coded. Of course, "typed" resources and other components of system 400 can still exist in order to generate the mapping at run time, based on equipment out of service.

Incorporating multiple subplants 720 or sinks 740 of the same type allows for modeling the interconnections between subplants 720, sources 710, storage 730, and sinks 740. This type of modeling describes which subplants 720 can use resource from which sources 710 and which subplants 720 can send resources to which sinks 740. This can be visualized as a resource connection matrix (i.e., a directed graph) between the subplants 720, sources 710, sinks 740, and storage 730. Examples of such directed graphs are described in greater detail with reference to FIGS. 5A-5B. Extending this concept, it is possible to include costs for delivering the resource along a connection and also, efficiencies of the transmission (e.g., amount of energy that makes it to the other side of the connection).

In some instances, constraints arise due to mechanical problems after an energy facility has been built. Accordingly, these constraints are site specific and are often not incorporated into the main code for any of subplants 720 or the high level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Incorporating minimum turndown and allowing disjoint operating regions may greatly enhance the accuracy of the asset allocation problem solution as well as decrease the number of modifications to solution of the asset allocation by the low level optimization or another post-processing technique. It may be beneficial to allow for certain features to change as a function of time into the horizon. One could use the full disjoint range (most accurate) for the first four hours, then switch to only incorporating the minimum turndown for the next two days, and finally using to the linear relaxation with no binary constraints for the rest of the horizon. For example, asset allocator 702 can be given the operational domain that correctly allocates three chillers with a range of 1800 to 2500 tons. The true subplant range is then the union of [1800, 2500], [3600, 5000], and [5400, 7500]. If the range were approximated as [1800, 7500] the low level optimization or other post-processing technique would have to rebalance any solution between 2500 and 3600 or between 5000 and 5400 tons. Rebalancing is typically done heuristically and is unlikely to be optimal. Incorporating these disjoint operational domains adds binary variables to the optimization problem (described in greater detail below).

Some decisions made by asset allocator 702 may be shared by multiple elements of system 400. The condenser water setpoint of cooling towers is an example. It is possible to assume that this variable is fixed and allow the low level optimization to decide on its value. However, this does not allow one to make a trade-off between the chiller's electrical use and the tower's electrical use, nor does it allow the optimization to exceed the chiller's design load by feeding it cooler condenser water. Incorporating these extrinsic decisions into asset allocator 702 allows for a more accurate solution at the cost of computational time.

Incentive programs often require the reservation of one or more assets for a period of time. In traditional systems, these assets are typically turned over to alternative control, different than the typical resource price based optimization. Advantageously, asset allocator 702 can be configured to add revenue to the cost function per amount of resource reserved. Asset allocator 702 can then make the reserved portion of the resource unavailable for typical price based cost optimization. For example, asset allocator 702 can reserve a portion of a battery asset for frequency response. In this case, the battery can be used to move the load or shave the peak demand, but can also be reserved to participate in the frequency response program.

Fault-Adaptive HVAC Controller

Figure 8:
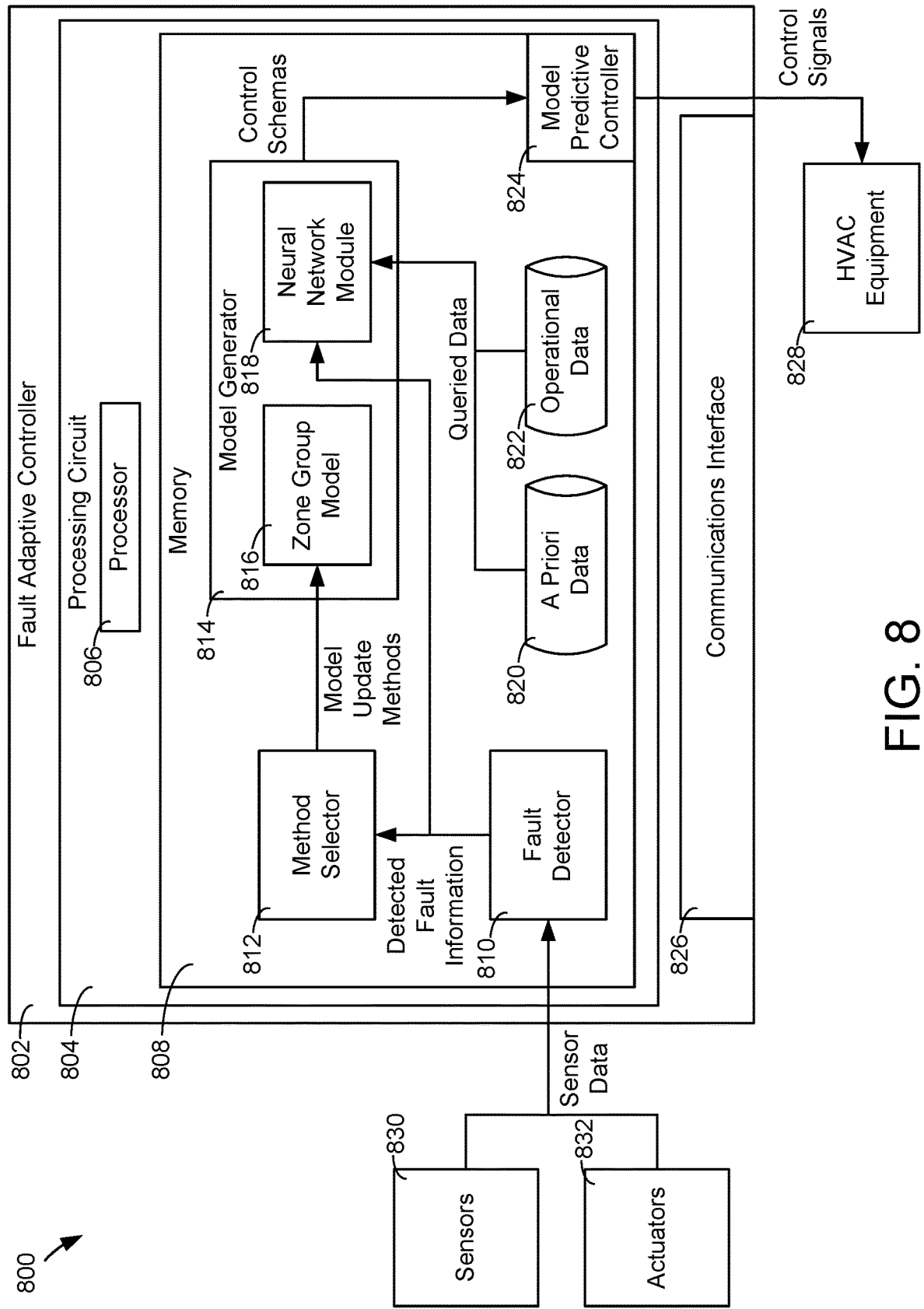
FIG. 8 is a system for implementing optimal control based on detected faults in a HVAC system, which may be part of the system of FIG. 5, according to some embodiments.

Referring now to FIG. 8, system 800 for automatically adjusting or adapting control schema and optimizing control decisions based on detected fault conditions is shown, according to an exemplary embodiment. System 800 is shown to include fault adaptive controller 802, HVAC equipment 828, sensors 830, and actuators 832. Fault adaptive controller 802 may be incorporated partially or entirely into any of the other controllers described herein, such as controller 504 or BMS controller 366. Fault adaptive controller 802 is shown to include processing circuit 804 including processor 806 and memory 808.

Processor 806 can be a general purpose or specific purpose processor, an application specific integrated circuit (ASIC), one or more field programmable gate arrays (FPGAs), a group of processing components, or other suitable processing components. Processor 806 is configured to execute computer code or instructions stored in the memory or received from other computer readable media (e.g., CDROM, network storage, a remote server, etc.), according to some embodiments.

In some embodiments, memory 808 can include one or more devices (e.g., memory units, memory devices, storage devices, etc.) for storing data and/or computer code for completing and/or facilitating the various processes described in the present disclosure. Memory 808 can include random access memory (RAM), read-only memory (ROM), hard drive storage, temporary storage, non-volatile memory, flash memory, optical memory, or any other suitable memory for storing software objects and/or computer instructions. Memory 808 can include database components, object code components, script components, or any other type of information structure for supporting the various activities and information structures described in the present disclosure. Memory 808 can be communicably connected to the processor via the processing circuitry and can include computer code for executing (e.g., by the processor) one or more processes described herein. Memory 808 is shown to include fault detector 810, method selector 812, model generator 814, databases 820, 822, and model predictive controller 824.

Fault detector 810 may be configured to receive sensor data from sensors 830 and determine one or more faults received by the sensor data. Sensors 830 may include any type of sensor commonly found in HVAC systems (e.g., within systems 100-500, etc.). In some embodiments, sensors 830 include various sensors for monitoring actuator operation within a HVAC system, including power sensors, positional sensors, voltage/current sensors, and flow sensors.

In some embodiments, sensors 830 provide sensor data at particular intervals (e.g., every 5 ms, every 50 ms, every 500 ms, etc.) such that sensors 830 provide time series data to fault adaptive controller 802 for processing. Fault detector 810 may be configured to analyze the received sensor data and determine whether the received sensor data is considered typical data or atypical (i.e., erroneous) data.

In some embodiments, fault detector 810 determines whether the received data has one or more faults by determining a modeled threshold for expected sensor values and receiving sensor data outside of the modeled threshold. For example, a positional sensor of sensors 830 for an actuator/valve assembly provides a sensor measurement that indicates a valve position of 45°. A modeled threshold has been generated (e.g., based on previous operational data) that, after an implemented control signal, the actuator/valve assembly is supposed be within the range of 50°-60°. Accordingly, fault detector 810 determines that the received position measurement is faulty sensor data. In some embodiments, the data may be off by a consistent amount over a period of time, indicating that a particular bias or offset is occurring in the received sensor data, rather than a single erroneous measurement. This pattern may be recognized by fault detector 810 as a fault in the sensor data. In some embodiments, the bias occurs even after filtering (e.g., after Kalman filtering, etc.).

In some embodiments, the sensor data is analyzed in various other ways to determine faulty readings, such as comparing the sensor readings to other sensor data taken from similar building zones within the building (e.g., building 10), using model predicative analytics (MPA) (e.g., model predictive control, asset allocation, etc.) to detect sensor faults, or determining simple sensor failure (i.e., no readings are provided). Fault detector 810 is further shown to provide detected fault information to method selector 812. The detected fault information may simply provide an indication of fault or non-fault (e.g., binary 1 for fault, binary 0 for non-fault, etc.). In other embodiments, the detected fault information includes more detailed analytics, such as a degree of predicted fault (e.g., 80% confident in a fault, etc.) or the reason for the fault and/or potential causes.

In some embodiments, the types of faults detected by fault detector 810 include actual faults at sensors 830 (e.g., incorrect readings, faulty installation, faulty power supply, etc.) and/or actuator 832 (e.g., stuck valve, incorrect installation, etc.), but can also include any type of device or event within building 10 that can affect the zone group model 816. For example, the types of faults detected can also include opening a window, opening a screen door, and/or significantly increasing/decreasing the amount of sunlight entering a room. In some embodiments, some or all factors that can affect zone group model 816 can be accounted for by model generator 814. In some embodiments, the term "fault(s)" can be or include anything that impacts the dynamics of a zone modeled by zone group model 816, or an ability to measure or control the space. As discussed above, these faults can include components or events that are not literal faults (e.g., opening a window, etc.).

It should be understood that any change that impacts system dynamics of an HVAC system or building space falls within the scope of a detected fault in the HVAC system, even if such a change is not associated with faulty equipment. Events commonly categorized as disturbances to the system (e.g., increased heat transfer into or out of a space as a result of leaving a window or door open, increased sunlight, etc.) or changes to the physical or thermodynamic properties of the space (e.g., new objects in the space that impact thermal energy storage/capacitance within the space, removal or addition of a temporary wall or partition in the space, etc.) fall within the scope of "faults in the HVAC system" as described herein. Accordingly, the fault-adapted predictive model described herein should be understood as adaptive to not only equipment faults that impact the performance of HVAC equipment, but also other types of changes that impact the dynamics of the HVAC system and/or building space. In general, any type of change that impacts the parameters of the predictive model can be detected and automatically compensated for by generating the fault-adapted predictive model.

Method selector 812 is shown to receive the detected fault information and determine a fault adaptation method to implement based on the received fault information. In various embodiments, the process of adjusting the models to compensate for faults (i.e., fault adaptation) is distinctly different from one or more control methods that make use of the adjusted model. In some embodiments, various methods are considered where some methods are more optimal based on the information provided. Various methods may be considered for data received by different HVAC devices. For example, data may be received by sensors 830 or by actuator devices communicably coupled to fault adaptive controller 802. The various control methods considered for data received by sensors 830 may be distinctly different than the various control methods considered for data received by the actuator devices. This is described in greater detail below.

In some embodiments, method selector 812 includes the simple method (e.g., control instructions, etc.) of correcting a bias when detected. In the above example, method selector 812 receives detected fault information that indicates detected faults with a determined bias and, upon analyzing the bias, adjusts the sensor data to mitigate the bias. In some embodiments, method selector 812 (or fault detector 810) may determine that there is bias in the sensor data based on similar data received in nearby building zones or within the same building zone(s) as monitored by fault adaptive controller 802 in the past. This data may be stored in a priori data 820 or operational data 822. While not shown in FIG. 8, a priori data 820 and operational data 822 may be provided to method selector 812 and/or any of the various modules within memory 808 for data retrieval/storage.

Sensor Faults

In some embodiments, method selector 812 selects a method from a first set of methods pertaining to control schemas for detecting sensor faults. In some embodiments, the first method in the first set of methods includes determining a reduced order model (e.g., simplified control model) when an HVAC unit (e.g., AC unite, etc.) is providing unreliable measurements. In other words, the differential equations used for modeling the heat transfer within zone 512 are reduced by decoupling the HVAC unit (e.g., removing the variables associated with the unreliable/erroneous HVAC unit in the equations) and adjusting the newly reduced equation in light of the removed portion, such that it can still accurately model zone 512.

In some embodiments, this method may be most appropriate in the event that several identical or substantially similar HVAC units and/or building zones are considered in the control modeling. The reason for needing areas and spaces where the building characteristics are similar to apply this method is because when an HVAC unit is decoupled, this does not affect the time constant response to outside air $$\frac{1}{C_{ia}R_{oi}},$$

the time constant to transfer heat to building thermal mass $$\frac{1}{C_{ia}R_{mi}}$$

and the time constant of the building thermal mass $$\frac{1}{C_m R_{mi}}.$$

It only affects the parameters that are volume dependent and capacity dependent which are $C_{ia}$ and $\dot{Q}_{HVAC}$ capacity. On the other hand, if the decoupled HVAC unit happens to be in a separate room or space where the building characterizes are not similar, then it is preferred to deploy method 2 since the values of $$\frac{1}{C_{ia}R_{oi}}, \frac{1}{C_m R_{mi}} \text{ and } \frac{1}{C_{ia}R_{mi}}$$

are also expected to change depending on the differences in the amount of building mass (e.g., walls, etc.) and effects from outside air.

For example, if the control schema considers five separate building zones all next to one another, each with a single HVAC unit in the building zones, where each of the building zones is an office room, receiving unreliable sensor measurements from one of the sensors for the HVAC unit of one of the rooms may trigger method selector 512 to select this first method in the first set of methods, thereby removing the HVAC unit from the control schema and adjusting the newly reduced equation. This adjusting may include continuing to model all five of the office rooms with only considering the (now) four HVAC units.

In some embodiments, this adjusting process, as mentioned in the above example, is performed by reducing the value of the $C_{ia}$ in the differential equations. Additionally, reducing the $\dot{Q}_{HVAC}$ capacity is implemented since that one or more HVAC units have been removed from the control schema. In some embodiments, $\dot{Q}_{HVAC}$ is not a model parameter that is expected to have a constant value but rather the time-varying amount of heating or cooling provided by the HVAC system, and cannot simply be changed in the equations in the same way that $C_{ia}$ is changed. Rather, the reduced capacity of $\dot{Q}_{HVAC}$ needs to be implemented by adjusting the constraint on the optimization process that defines the maximum value that $\dot{Q}_{HVAC}$ can take. This may limit fault adaptive controller 802 to selecting a value of $\dot{Q}_{HVAC}$ within the adjusted range when performing the optimization.

In another example, fault adaptive controller 802 is controlling one open space area including 4 HVAC units with equal capacities of 10 kilowatts each (i.e., a total of 40 kilowatts) and the indoor air thermal capacitance $C_{ia}$ is 20 kilowatt-hours per Kelvin. Then, after decoupling one of the HVAC units and letting fault controller 502 only control a portion of the space of the remaining three HVAC units, the thermal capacitance value is reduced from 20 kilowatts hours per Kelvin to 15 kilowatts hours per Kelvin. Additionally, $\dot{Q}_{HVAC}$ capacity is reduced from 40 kilowatts to 30 kilowatts.

In some embodiments, the relationship between the indoor air temperature and the temperature set-point is assumed follows a proportional-integral control that is described by the following equation:

$$\dot{Q}_{HVAC} = K_p \varepsilon_{sp} + K_I \int_0^t \varepsilon_{sp}(S) ds \quad \text{(Eq. 9)}$$

$$\varepsilon_{sp} = T_{sp} - T_{ia} \quad \text{(Eq. 10)}$$

Where $K_p$ and $K_I$ are PI controller gain parameters. Incorporating the thermal and the HVAC load models together and writing the system of equations as a linear system of differential equations gives the following state space representation:

$$\begin{bmatrix} \dot{T}_{ia} \\ \dot{T}_m \\ \dot{I} \end{bmatrix} = \begin{bmatrix} \frac{1}{C_{ia}}\left(-K_p - \frac{1}{R_{mi}} - \frac{1}{R_{oi}}\right) & \frac{1}{C_{ia}R_{mi}} & \frac{K_I}{C_{ia}} \\ \frac{1}{C_m R_{mi}} & -\frac{1}{C_m R_{mi}} & 0 \\ -1 & 0 & 0 \end{bmatrix} \begin{bmatrix} T_{ia} \\ T_m \\ I \end{bmatrix} + \quad \text{(Eq. 11)}$$

$$\begin{bmatrix} \frac{K_p}{C_{ia}} & \frac{1}{C_{ia}R_{oi}} \\ 0 & 0 \\ 1 & 0 \end{bmatrix} \begin{bmatrix} T_{sp} \\ T_{oa} \end{bmatrix} + \begin{bmatrix} \frac{1}{C_{ia}} \\ 0 \\ 0 \end{bmatrix} \dot{Q}_{other}$$

$$\begin{bmatrix} T_{ia} \\ \dot{Q}_{HVAC} \end{bmatrix} = \begin{bmatrix} 1 & 0 & 0 \\ -K_p & 0 & K_I \end{bmatrix} \begin{bmatrix} T_{ia} \\ T_m \\ I \end{bmatrix} + \begin{bmatrix} 0 & 0 \\ K_p & 0 \end{bmatrix} \begin{bmatrix} T_{sp,j} \\ T_{oa} \end{bmatrix} \quad \text{(Eq. 12)}$$

where $T_{ia}$ is based on an average of "good" sensors (e.g., sensors that are not providing faulty readings, etc.). In some embodiments, another method of modeling is considered that does not incorporate the $K_p$ and $K_I$ PI controller gain parameters.

Another method that may be considered by method selector 512 when receiving faulty sensor data is removing the portion of the differential equations dealing with the fault sensor readings and re-modeling the control equations. This may differ from the first method in the first set, as the first method related to adjusting a previously determined control schema, rather than generating a new control schema and/or a new control model. In some embodiments, this includes decoupling all HVAC units associated with the control equations and re-generating a system model of control equations to model the building zone(s) without the faulty HVAC unit. In some embodiments, this includes re-identifying the system model by performing a system identification process.

Actuator Faults

In some embodiments, another set of methods may be considered by method selector 812 in response to detecting one or more faulty actuators (e.g., actuators 832). In some embodiments, indications of faulty actuator operation (or data indicating faulty operation) may come directly from sensors coupled to actuator 832, processing circuitry within actuator 832 that provides an indication of malfunctioning circuitry to fault adaptive controller 802, and various other implementations for providing information to fault adaptive controller 802.

In some embodiments, fault detector 810 is configured to detect and/or determine actuator faults. For example, the actuator 832 gets stuck and malfunctions due to a mechanical problem that obstructs actuator 832 from achieving the desired control or actuation action. This is detected by fault adaptive controller 802 sending set points and using the identified building thermal model to predict the amount of heating or cooling that should be supplied to zone 512 in order to achieve this desired set-point. If the zone temperature is far away from set-point and the actual heating or cooling supplied does not respond to our desired set-point while the HVAC system not being saturated, then fault adaptive controller 802 concludes that actuator 832 is faulty. In another example, fault detector 810 compares the amount of heating or cooling predicted and supplied to the zone and, if the difference exceeds a certain threshold, then actuator 832 is considered faulty. This can occur when actuators can change values (e.g., not completely stuck), but still working in a malfunctioning way.

In various embodiments, other methods for detecting actuator faults may be considered, such as actions of actuator 832 to actions within the same floor or buildings and comparing responses to similar inputs to fault adaptive controller 802, using model predicative analytics (MPA) to detect actuator faults, and simple actuator failure (e.g., actuator is completely broken, actuator is not sending any data, etc.).

Still referring to FIG. 8, method selector 812 may select one or more methods from a second set of methods for adjusting and/or adapting control schema based on detected actuator faults. In some embodiments, the detected actuator faults may be detected in one of the various ways described above. While only three exemplary methods for automatically adjusting or adapting a predictive model based on detected actuator faults are described herein, these are merely meant to be exemplary and are not intended to be in any way limiting.

In some embodiments, a first method may be considered when the fault of the actuator (e.g., valve position, etc.) is known. This may be the case when a valve has been stuck in a single position for a long period of time, indicating that there is some malfunction occurring within the valve/actuator assembly. In some embodiments, valves are designed to fail in a "heating" capacity, wherein a failure in the valve operation results in increased heat supplied downstream of the HVAC system, rather than decreased heat (e.g., chilled fluid, etc.).

In some embodiments, this first method may optimize control actions while accounting for the fact that one or more HVAC units has an actuator fault. This will provide the optimal control action possible while taking the faults into account. This can provide a robust and optimal control schema (e.g., model predictive control (MPC), etc.) that can minimize energy and cost significantly. In some embodiments, this strategy is the optimal control strategy until the actuator fault is fixed (e.g., the fault is no longer occurring). In some embodiments, the fault added to the control schema as a known variable that can be implemented in the control scheme differential equations, while also decoupling the faulty HVAC unit (e.g., the actuator/valve assembly) from the control schema. This may be performed by adding an extra column into the B and D matrices of Eq. 11 and Eq. 12 and adding $\dot{Q}_{Fault}$ as an input where $\dot{Q}_{fault}$ represents the amount of heating or cooling supplied to the space due to the actuator fault. This would result in the following modified state-space model:

$$\begin{bmatrix} \dot{T}_{ia} \\ \dot{T}_m \\ \dot{I} \end{bmatrix} = \begin{bmatrix} \frac{1}{C_{ia}}\left(-K_p - \frac{1}{R_{mi}} - \frac{1}{R_{oi}}\right) & \frac{1}{C_{ia}R_{mi}} & \frac{K_I}{C_{ia}} \\ \frac{1}{C_m R_{mi}} & -\frac{1}{C_m R_{mi}} & 0 \\ -1 & 0 & 0 \end{bmatrix} \begin{bmatrix} T_{ia} \\ T_m \\ I \end{bmatrix} +$$

$$\begin{bmatrix} \frac{K_p}{C_{ia}} & \frac{1}{C_{ia}R_{oi}} & \frac{1}{C_{ia}} \\ 0 & 0 & 0 \\ 1 & 0 & 0 \end{bmatrix} \begin{bmatrix} T_{sp,j} \\ T_{oa} \\ \dot{Q}_{Fault} \end{bmatrix} + \begin{bmatrix} \frac{1}{C_{ia}} \\ 0 \\ 0 \end{bmatrix} \dot{Q}_{other}$$

$$\begin{bmatrix} T_{ia} \\ \dot{Q}_{HVAC} \end{bmatrix} = \begin{bmatrix} 1 & 0 & 0 \\ -K_p & 0 & K_I \end{bmatrix} \begin{bmatrix} T_{ia} \\ T_m \\ I \end{bmatrix} + \begin{bmatrix} 0 & 0 & 0 \\ K_p & 0 & 0 \end{bmatrix} \begin{bmatrix} T_{sp,j} \\ T_{oa} \\ \dot{Q}_{Fault} \end{bmatrix}$$

(Eqs. 13)

where the capacity value of $\dot{Q}_{HVAC}$ is reduced since one (or more) of the HVAC units (e.g., units controlled by the actuator, actuator/valve assembly, etc.) is no longer operable and being controlled by fault adaptive controller 802. For example, fault adaptive controller 802 controls a building zone with four HVAC units with equal capacities of 10 kilowatts each (a total of 40 kilowatts). A fault in actuator 832 occurs in one of the HVAC unit causing it to constantly supply heat at a rate of 5 kilowatts. This variable is then added into the control equations as $\dot{Q}_{fault}=5$ kilowatts, where $\dot{Q}_{fault}$ is added to the matrices as shown in Eqs. 13 above. Consequently, since the fault adaptive controller 802 can no longer control the offline HVAC unit, then the capacity in the optimization problem is set to 30 kilowatts. However in some embodiments, thermal capacitance (e.g., $C_{ia}$) is not reduced as none of the HVAC units have been decoupled, rather the fault information has been incorporated into the control equations.

Another method that may be considered for automatically adjusting or adapting a predictive model based on detected actuator faults is the second method in the second set of methods considered by method selector 812. In some embodiments, the second method may be optimal when the $\dot{Q}_{Fault}$ value cannot be determined. This may be the case when actuator 832 is not necessarily staying in one location, but is sporadically moving between positions in a random or indeterminable fashion. This may also be the case when there is a communication error between the transmitter of the actuator fault information (e.g., a radio coupled to actuator 832, a sensor coupled to actuator 832, etc.).

In this method, the faulty HVAC unit may be decoupled in regards to the control equations and a reduced-order control model is implemented after removal of the faulty HVAC device. In some embodiments, the second method is obtained by reducing the value of the $C_{ia}$ for the building thermal model. Additionally, the $\dot{Q}_{HVAC}$ capacity is reduced since one or more HVAC units have been removed from control under fault adaptive controller 802 and similarly the control equations. For example, fault adaptive controller 802 controls 4 HVAC units (e.g., 4 actuators 832) with equal capacities of 10 kilowatts each (i.e., a total of 40 kilowatts) and the indoor air thermal capacitance $C_{ia}$ is 20 kilowatt-hours per Kelvin. In response to determining a fault in one of the faulty HVAC units, fault adaptive controller 802 adjusts to control only a portion of the space and the remaining 3 HVAC units. For example, the thermal capacitance value $C_{ia}$ is reduced from 20 kilowatts hours per Kelvin to 15 kilowatts hours per Kelvin, and the maximum $\dot{Q}_{HVAC}$ capacity is reduced from 40 kilowatts to 30 kilowatts. In this example, both $C_{ia}$ and the maximum allowable value of $\dot{Q}_{HVAC}$ are reduced by one fourth because one fourth of the building zone and one of the four HVAC units cannot be controlled. In some embodiments, this method (the second method of the second set of methods) is identical or substantially similar to the first method of the first set of methods described herein.

In some embodiments, the second method of the second set of methods is most applicable for control schemas where fault adaptive controller 802 controls a zone or space with similar HVAC units. The reason for needing areas and spaces where the building characteristics are similar to apply this method is because when an HVAC unit is decoupled, this does not affect the time constant response to outside air $$\frac{1}{C_{ia}R_{oi}},$$

the time constant to transfer heat to building thermal mass $$\frac{1}{C_{ia}R_{mi}}$$

and the time constant of the building thermal mass $$\frac{1}{C_m R_{mi}}.$$

Rather, it only affects the parameters that are volume dependent and capacity dependent which are $C_{ia}$ and $\dot{Q}_{HVAC}$ capacity. However, if the decoupled HVAC unit happens to be in a separate room or space where the building characterizes are not similar, then it may be preferable to deploy another type of method (e.g., method 3 as described below) since the values of $$\frac{1}{C_{ia}R_{oi}}, \frac{1}{C_m R_{mi}} \text{ and } \frac{1}{C_{ia}R_{mi}}$$

are also expected to change depending on the differences in the amount of building mass (e.g., walls, etc.) and effects from outside air.

Another method that may be considered for automatically adjusting or adapting a predictive model based on detected actuator faults is the third method (method 3) in the second set of methods considered by method selector 812. In some embodiments, the third method refers to decoupling all HVAC devices from the control schema and generating a new control schema that does not include the decoupled HVAC unit or the fault information (e.g., heat added/removed from the fault) in the control equations. This step may be substantially similar or identical to the second method in the first set of methods described above with regards to methods in response to sensor faults. Method selector 812 is shown to provide control updates (e.g., selected model update methods) to model generator 814. Control updates may include the selected model update method that is to be implemented to optimize the control over various zones and spaces being monitored by fault adaptive controller 802.

Still referring to FIG. 8, model generator 814 may be configured to generate a model that implements the model adaptations provided by method selector 812. In some embodiments, the model may include both the equations shown above that define the system dynamics as well as a set of constraints that define the permissible values of the control variables that are adjusted by the controller when using the model to perform MPC. For example, the value of $\dot{Q}_{HVAC}$ is something that the controller would optimize when performing MPC. The model may be generated by either adjusting or adapting an existing model (e.g., changing the values of one or more of the model parameters, adjusting the threshold values of constraints that define permissible ranges of control variables, etc.) and/or by generating a new model (e.g., by performing a system identification process to generate new values of model parameters). In some embodiments, the model generated by model generator 814 is based on mapped points from the physical site, and acts as a digital twin of the zone(s) being monitored by fault adaptive controller 802. In some embodiments, the model is automatically generated by performing an automated system identification process to generate values for the model parameters (e.g., training the model), or is partially or entirely generated manually from a user or technician. In various embodiments, the model represents the zone (e.g., zone 512) monitored by fault adaptive controller 802. Model generator 814 is shown to include zone group model 816 and neural network module 818.

Zone group model 816 may act as the core of the model generated by model generator 814. Zone group model 816 may include the functionality of mapped points to the physical site of zone 512 and/or the generated control equations for modeling zone 512. Neural network module 818 may be configured to receive data relating to the operation of system 800 and use that received data to train model generator 814 to improve the models generated. In some embodiments, a priori data 820 and operational data 822 is provided to neural network module 818 to act as training data. Neural network module 818 may use this data to determine trends in operation of actuator 832, trends in the general operation of system 800, typical operational ranges of various devices in system 800, trends in faults to determine whether faults are single instances or part of a biased transmission, or any combination thereof. Model generator 814 is shown to provide control schemas to model predictive controller 824 for implementing the selected control schema. Model predictive controller 824 may then provide control signals to HVAC equipment 828 based on the selected control schema.

Fault-Adaptive Control Processes

Figure 9:
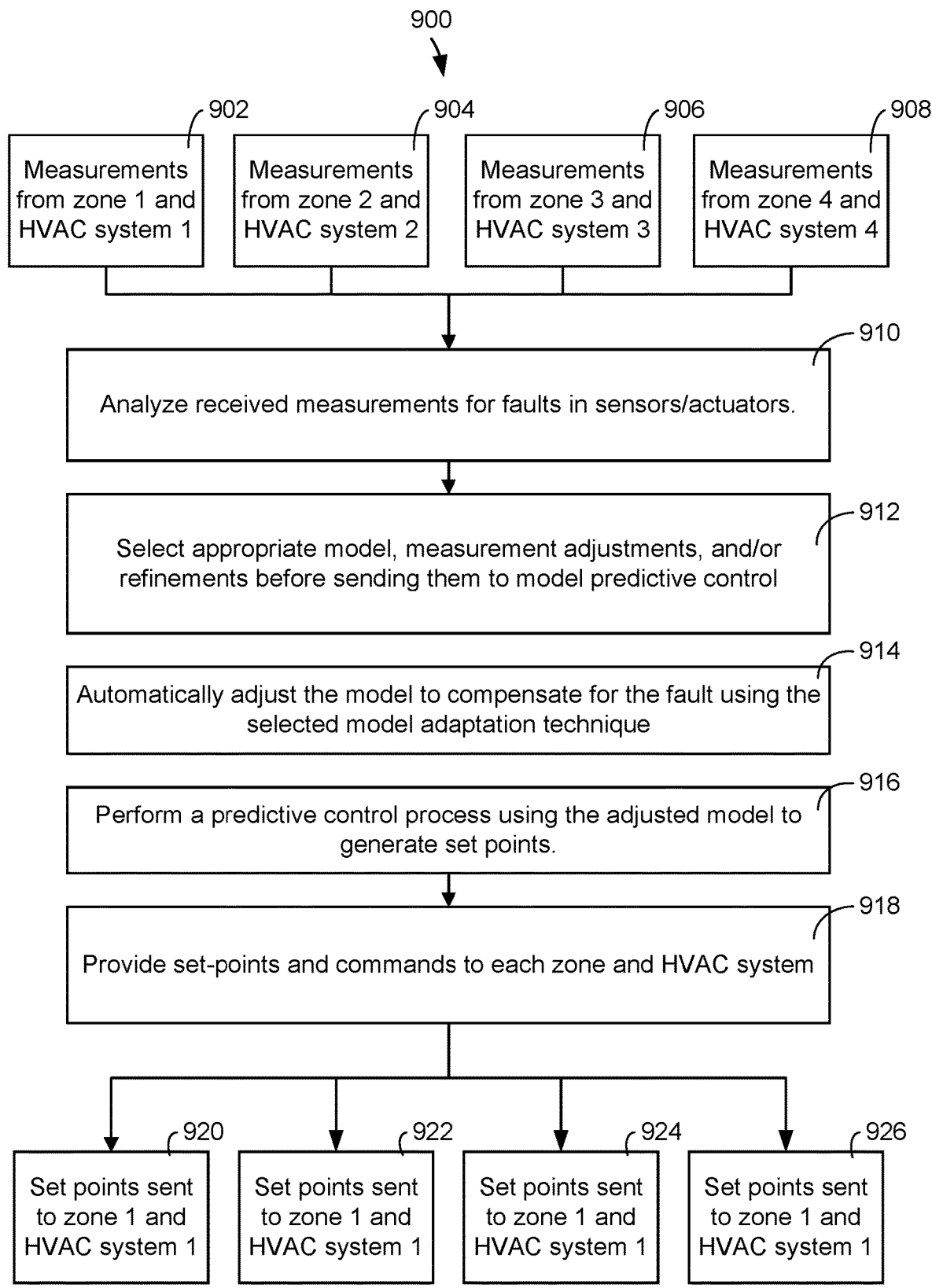
FIG. 9 is a flow diagram of a process for implementing optimal control based on detected faults in a HVAC system, which can be performed by the controller of FIG. 8, according to some embodiments.

Referring now to FIG. 9, a process 900 for automatically adjusting or adapting a predictive model for a building zone or zones based on received faults of one or more HVAC devices and using the adapted model to optimize control of the building zone or zones is shown, according to some embodiments. In some embodiments, process 900 is performed by fault adaptive controller 802. In other embodiments, process 900 can be performed by any of the controllers or processing circuits described herein, either partially or entirely.

Process 900 is shown to include receiving measurements from zones 1-4 and HVAC systems 1-4, respectively (steps 902-908). In some embodiments, fault adaptive controller 802 may be monitoring one or more building zones and/or one or more HVAC systems. As described herein, a building zone may refer to any floor, space, location, or region of a building. The building zone may include a single feedback loop to a controller from a sensor monitoring a single HVAC device, or multiple loops for multiple devices. In some embodiments, zones 1-4 may refer to zones or zone groups, not necessarily individual zones (e.g., zone 502).

Process 900 is shown to include analyzing received measurements for faults in sensors/actuators (step 910). In some embodiments, fault actuator 802 may receive data from sensors 830 or actuators 832 and determine whether the received data is indicative of a fault. This may be performed by fault detector 810 as described above.

Process 900 is shown to include selecting the appropriate model adjustments, measurement adjustments, and/or refinements before sending them to model predictive control (step 912). In some embodiments, this step is performed by method selector 812. Method selector 812 may select of the various methods as described above prior to implementing the control decision in a predictive modeling control scheme (e.g., MPC). This step may be performed if one or more methods would provide a more efficient or more optimal control over the monitored building zone compared to other methods.

Process 900 is shown to include automatically adjusting the model to compensate for the fault using the selected model adaptation technique (step 914). In some embodiments, step 914 includes adjusting the model via method selector 812, model generator 814, or both. Method selector 812 may receive the detected fault information and determine a fault adaptation method to implement based on the received fault information. In various embodiments, the process of adjusting the models to compensate for faults (i.e., fault adaptation) is distinctly different from one or more control methods that make use of the adjusted model.

Process 900 is shown to include performing a predictive control process using the adjusted model to generate set points (step 916). In some embodiments, deciding the optimal set points refers to adjusting the set points for various HVAC equipment (e.g., boilers, chillers, HVAC units, thermostats, VAV boxes, RTU's, etc.) to satisfy the control schema selected by method selector 812. In some embodiments, the step 914 is performed by model generator 814, model predictive controller 824, or both. Step 916 may be implemented to relate the control equations for a particular building zone with the physical actions required to satisfy the control equations, by manipulating one or set points within system 800.

Process 900 is shown to include providing set points and commands to each zone and HVAC system (step 918). Once the set points have been determined, model predictive controller 824 may implement these set points in an optimal manner, such that efficiency and cost savings are considered. For example, if the temperature of a particular room needs to be increased, it may more optimal to engage three boilers at 20% capacity than one boiler at 70% capacity. Model predictive controller 824 may perform various optimization simulations to determine the most efficient way to achieve the desired set points.

Process 900 is shown to include set points being provided to zones 1-4 and HVAC systems 1-4 (steps 920-926). Model predictive controller 824 may provide the control signals to the various HVAC equipment 828 to satisfy the control instructions in an optimal manner. Zones 1-4 and HVAC systems 1-4 may be identical to those described in steps 902-908, such that a feedback system for all zones is established and controlled via fault adaptive controller 802.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for automatically adapting a predictive model used to control a heating, ventilation, or air conditioning (HVAC) system in a building to make adjustments based on a detected fault in the HVAC system, the method comprising:
   determining that the detected fault in the HVAC system is based on a stuck actuator fault from a stuck actuator;
   determining an impact of the detected fault on an operational performance of at least one of the HVAC system or a zone of the building;
   adjusting one or more parameters of the predictive model based on the impact of the detected fault to generate a fault-adapted predictive model, the adjusting the one or more parameters comprising adjusting one or more constraints affecting inputs to the predictive model based on the stuck actuator; and
   operating the HVAC system to control an environmental condition of the building using the fault-adapted predictive model, the operating the HVAC system comprising operating a portion of the HVAC system to provide a constant amount of heating or cooling upon determining that the detected fault is based on the stuck actuator fault from the stuck actuator.

2. The method of claim 1, wherein the detected fault is at least one of: a fault that results in a constant cooling or heating, a fault that renders the HVAC system unavailable, a fault that reduces an available capacity, or a fault that reduces an efficiency of the HVAC system.

3. The method of claim 1, wherein the adjusting the one or more parameters of the predictive model comprises triggering an identification process of at least one of:
   one or more dynamics of the HVAC system; or
   one or more dynamics of the building,
   wherein the identification process is based on an accuracy error exceeding a threshold.

4. The method of claim 1, wherein the determining the impact of the detected fault comprises calculating a thermal capacitance within a building zone, the thermal capacitance related to the operational performance of the HVAC system.

5. The method of claim 1, wherein the one or more parameters define a set of dynamics of the HVAC system or a set of dynamics of one or more zones in the building; and
   the method further comprises adjusting one or more threshold values for control variables in the HVAC system.

6. The method of claim 1, further comprising selecting an optimal control scheme by:
   determining the detected fault is a decreased efficiency type of fault and an effect of the detected fault on at least one of the HVAC system or the zone of the building, the effect comprising a tangible amount of energy added to or removed from the HVAC system; and adjusting the one or more parameters of the predictive model to incorporate the effect of the detected fault.

7. The method of claim 1, comprising obtaining an indication of the detected fault in the HVAC system by:
receiving data from one or more HVAC sensors, the data comprising operational information relating to at least one of the HVAC system or the zone of the building;
comparing the data to a predetermined range of normal operation; and
determining the detected fault based on the data being outside of the predetermined range of normal operation.

8. The method of claim 1, wherein the adjusting the one or more parameters of the predictive model comprises re-identifying the predictive model by performing an event-based system identification process.

9. The method of claim 1, further comprising performing a fault detection process to generate an indication of the detected fault, the fault detection process comprising using a neural network to detect abnormal operation of the HVAC system based on a set of training data that indicates normal operation of the HVAC system.

10. The method of claim 1, wherein the operating the HVAC system to control the environmental condition of the building comprises using the fault-adapted predictive model to generate constraints for an optimization problem.

11. The method of claim 1, comprising obtaining an indication of the detected fault in the HVAC system by obtaining an indication of abnormal operation in one or more building management systems (BMSs) or degradation in compressor operation or air flow restriction in an air duct or refrigerant leakage.

12. A controller for automatically adapting a predictive model used to control a heating, ventilation, or air conditioning (HVAC) system in a building to make adjustments based on a detected fault in the HVAC system, the controller comprising a processing circuit configured to:
determine an amount of constant cooling energy or heating energy provided by a portion of the HVAC system as a result of the detected fault;
adjust one or more parameters of the predictive model based on the result of the detected fault to generate a fault-adapted predictive model; and
operate the HVAC system to control an environmental condition of the building using the fault-adapted predictive model.

13. The controller of claim 12, wherein the processing circuit is further configured to select an optimal control scheme by:
determining the detected fault is a decreased efficiency type of fault and an effect of the detected fault on the HVAC system, the effect comprising a tangible amount of energy added to or removed from the HVAC system; and
adjusting one or more parameters of the predictive model to incorporate the effect of the detected fault.

14. One or more non-transitory computer-readable storage media having computer-executable instructions stored thereon that, when executed by one or more processors, cause the one or more processors to perform operations comprising:
determining an impact of a detected fault on an operational performance of a HVAC system, the detected fault being failure of a HVAC device of the HVAC system;
adjusting one or more values used in an optimization problem based on the impact of the detected fault to generate a fault-adapted predictive model, the adjusting comprising reducing the one or more values by an amount proportional to a capacity of the HVAC device relative to a total capacity of the HVAC system; and
operating the HVAC system to control a variable state or condition of the HVAC system using the fault-adapted predictive model.

15. A method for automatically adapting a predictive model used to control a heating, ventilation, or air conditioning (HVAC) system in a building to make adjustments based on a detected fault in the HVAC system, the method comprising:
determining that the detected fault is based on a sensor in the HVAC system;
determining an impact of the detected fault on an operational performance of at least one of the HVAC system or a zone of the building;
adjusting one or more parameters of the predictive model based on the impact of the detected fault to generate a fault-adapted predictive model by reducing the one or more parameters by an amount proportional to a capacity of a HVAC device relative to a total capacity of the HVAC system; and
operating the HVAC system to control an environmental condition of the building using the fault-adapted predictive model.

* * * * *